US011942287B2

(12) United States Patent
Shi

(10) Patent No.: US 11,942,287 B2
(45) **Date of Patent: *Mar. 26, 2024**

(54) CONTROL DEVICE FOR CONTROLLING MULTIPLE OPERATING CHARACTERISTICS OF AN ELECTRICAL LOAD

(71) Applicant: Lutron Technology Company LLC, Coopersburg, PA (US)

(72) Inventor: Shan Shi, Hellertown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 113 days.

This patent is subject to a terminal disclaimer.

(21) Appl. No.: 17/212,198

(22) Filed: Mar. 25, 2021

(65) Prior Publication Data

US 2021/0217566 A1 Jul. 15, 2021

Related U.S. Application Data

(63) Continuation of application No. 16/600,216, filed on Oct. 11, 2019, now Pat. No. 10,964,494.

(Continued)

(51) Int. Cl.
*H01H 19/58* (2006.01)
*F21V 23/04* (2006.01)

(Continued)

(52) U.S. Cl.
CPC ....... *H01H 19/585* (2013.01); *F21V 23/0435* (2013.01); *H01H 7/08* (2013.01); *H05B 47/16* (2020.01)

(58) Field of Classification Search
CPC ........ H05B 47/19; H05B 47/10; H05B 47/11; H05B 45/00; H05B 39/041; H05B 45/20; F21V 23/0492; F21V 23/023; Y02B 20/40; H01H 19/585; H01H 7/08; H01H 25/06; H01H 9/16; H01H 13/64; H01H 25/065
See application file for complete search history.

(56) References Cited

U.S. PATENT DOCUMENTS 5,264,761 A 11/1993 Johnson et al.
5,841,428 A * 11/1998 Jaeger ................. G02F 1/13306 345/184

(Continued)

FOREIGN PATENT DOCUMENTS

CN 2596671 Y 12/2003
DE 202006006509 U1 10/2007

(Continued)

*Primary Examiner* — Renan Luque
(74) *Attorney, Agent, or Firm* — Flaster Greenberg P.C.

(57) ABSTRACT

A load control device may be configured to control multiple characteristics of one or more electrical loads such as the intensity and color of a lighting load. The load control device may switch from controlling one characteristic of the electrical loads to controlling another characteristic of the electrical loads based on the position of one or more components of the load control device. Such a position may be manipulated by moving the one or more components relative to an idle position of the load control device. The load control device may be a wall-mounted device or a battery-powered remote control device.

20 Claims, 12 Drawing Sheets

Related U.S. Application Data

(60) Provisional application No. 62/744,859, filed on Oct. 12, 2018.

(51) Int. Cl.
*H01H 7/08* (2006.01)
*H05B 47/16* (2020.01)

(56) References Cited

U.S. PATENT DOCUMENTS

| | | | | |
|---|---|---|---|---|
| 7,242,150 | B2 | 7/2007 | DeJonge et al. | |
| 7,546,473 | B2 | 6/2009 | Newman et al. | |
| 7,573,208 | B2 | 8/2009 | Newman et al. | |
| 7,834,856 | B2 | 11/2010 | Grinshpoon et al. | |
| 8,195,313 | B1 * | 6/2012 | Fadell | G05D 23/1917 236/1 C |
| 8,330,638 | B2 | 12/2012 | Altonen et al. | |
| 8,664,881 | B2 | 3/2014 | Salvestrini et al. | |
| 9,208,965 | B2 | 12/2015 | Busby et al. | |
| 9,338,864 | B2 * | 5/2016 | Bosua | H05B 45/00 |
| 9,418,802 | B2 | 8/2016 | Romano et al. | |
| 9,520,247 | B1 | 12/2016 | Finnegan et al. | |
| 9,583,288 | B2 | 2/2017 | Jones et al. | |
| 9,799,469 | B2 | 10/2017 | Bailey et al. | |
| 9,959,997 | B2 | 5/2018 | Bailey et al. | |
| 10,405,407 | B2 | 9/2019 | Chalmers et al. | |
| 10,964,494 | B2 * | 3/2021 | Shi | H05B 47/16 |
| 11,202,351 | B2 * | 12/2021 | Dimberg | H02J 3/00 |
| 11,310,876 | B2 * | 4/2022 | Bosua | F21V 23/0492 |
| 2008/0111491 | A1 | 5/2008 | Spira et al. | |
| 2009/0078548 | A1 | 3/2009 | Singh et al. | |
| 2010/0148997 | A1 * | 6/2010 | Xu | H01H 13/64 341/22 |
| 2012/0242247 | A1 * | 9/2012 | Hartmann | H05B 47/185 315/294 |
| 2012/0292174 | A1 | 11/2012 | Mah et al. | |
| 2015/0077021 | A1 | 3/2015 | McCarthy et al. | |
| 2015/0371534 | A1 | 12/2015 | Dimberg et al. | |
| 2016/0073479 | A1 | 3/2016 | Erchak et al. | |
| 2017/0105176 | A1 | 4/2017 | Finnegan et al. | |
| 2017/0280534 | A1 * | 9/2017 | Dimberg | H05B 47/19 |
| 2017/0354011 | A1 * | 12/2017 | Dimberg | H01H 19/54 |
| 2018/0190451 | A1 | 7/2018 | Scruggs | |
| 2019/0180957 | A1 * | 6/2019 | Kurokawa | H01H 13/64 |

FOREIGN PATENT DOCUMENTS

| | | | |
|---|---|---|---|
| WO | 2010126004 | A1 | 11/2010 |
| WO | 2014179531 | A2 | 11/2014 |
| WO | 2017210517 | A2 | 12/2017 |

* cited by examiner

CONTROL DEVICE FOR CONTROLLING MULTIPLE OPERATING CHARACTERISTICS OF AN ELECTRICAL LOAD

CROSS-REFERENCE TO RELATED APPLICATIONS

This application is a continuation of U.S. patent application Ser. No. 16/600,216, filed Oct. 11, 2019, which claims the benefit of Provisional U.S. Patent Application No. 62/744,859, filed Oct. 12, 2018, the disclosure of which is incorporated herein by reference in its entirety.

BACKGROUND

Control devices, such as remote controls and dimmer switches, are used to control the operation of one or more electrical loads, such as lighting loads. A control device may be designed to allow a user to control the electrical load(s) in one or more ways. For example, the control device may be designed to control the intensity of a lighting load, the volume of speakers, the color (e.g., color temperature) of a lighting load, the selection and/or configuration of presets for one or more electrical loads, etc. Traditionally, the actuators of a control device are designed to control one specific aspect of the electrical load. For example, one actuator on a dimmer switch may be only capable of controlling the intensity of a lighting load, while another actuator is used to turn the lighting load on and off. For additional control, the control device typically requires the addition of multiple actuators (e.g., buttons), and in some instances, may leverage a variety of button combinations and/or different durations of taps and holds to enable the additional control of the electrical load. However, control devices tend to lose their aesthetic appeal as more actuators are added to the device. And without the inclusion of additional actuators, the control devices lose the ability to provide additional or advanced control of the electrical loads.

SUMMARY

As described herein, a control device may be configured for use in a load control system to control respective amount of power delivered to one or more electrical loads. The control device may be external to the one or more electrical loads, and may include a base portion, a rotating portion rotatable with respect to the base portion, an actuation portion defining a front surface, and a control circuit. The base portion may be configured to be mounted to an electrical wallbox (e.g., when the control device is a dimmer switch) or over an existing mechanical switch (e.g., when the control device is a retrofit remote control device). When configured as a dimmer device, the control device may further include a load control circuit adapted to be electrically coupled in series between an AC power source and the one or more electrical loads for controlling power delivered to the one or more electrical loads. When configured as a retrofit remote control device, the control device may be mounted over a toggle actuator of a mechanical switch that controls whether power is delivered to the one or more electrical loads.

The front surface of the actuation portion may be biased to an idle plane along an axis that is perpendicular to the base portion. The actuation portion of the control device may be actuated along the axis perpendicular to the base portion through at least a first distance and a second distance to place the front surface of the actuation portion into respective first and second planes that are parallel to the idle plane. The control circuit may be configured to generate first control data for changing a first characteristic (e.g., an intensity) of the one or more electrical loads in response to the actuation of the actuation portion through the first distance. The control circuit may be configured to generate second control data for changing a second characteristic (e.g., a color) of the one or more electrical loads in response to the actuation of the actuation portion through the second distance. The control circuit may be further configured to determine what type of control data is to be generated based on how long the front surface of the actuation portion is maintained in the first or second plane. The control device may comprise a communication circuit configured to transmit, e.g., to the one or more electrical loads, a first control signal associated with the first control data and a second control signal associated with the second control data.

The control device may further include one or more visual indicators configured to be illuminated by one or more light sources. The one or more visual indicators may comprise a light bar. When illuminated, the light bar may provide feedback about the first and/or second characteristics of the one or more electrical loads.

DETAILED DESCRIPTION

Figure 1:
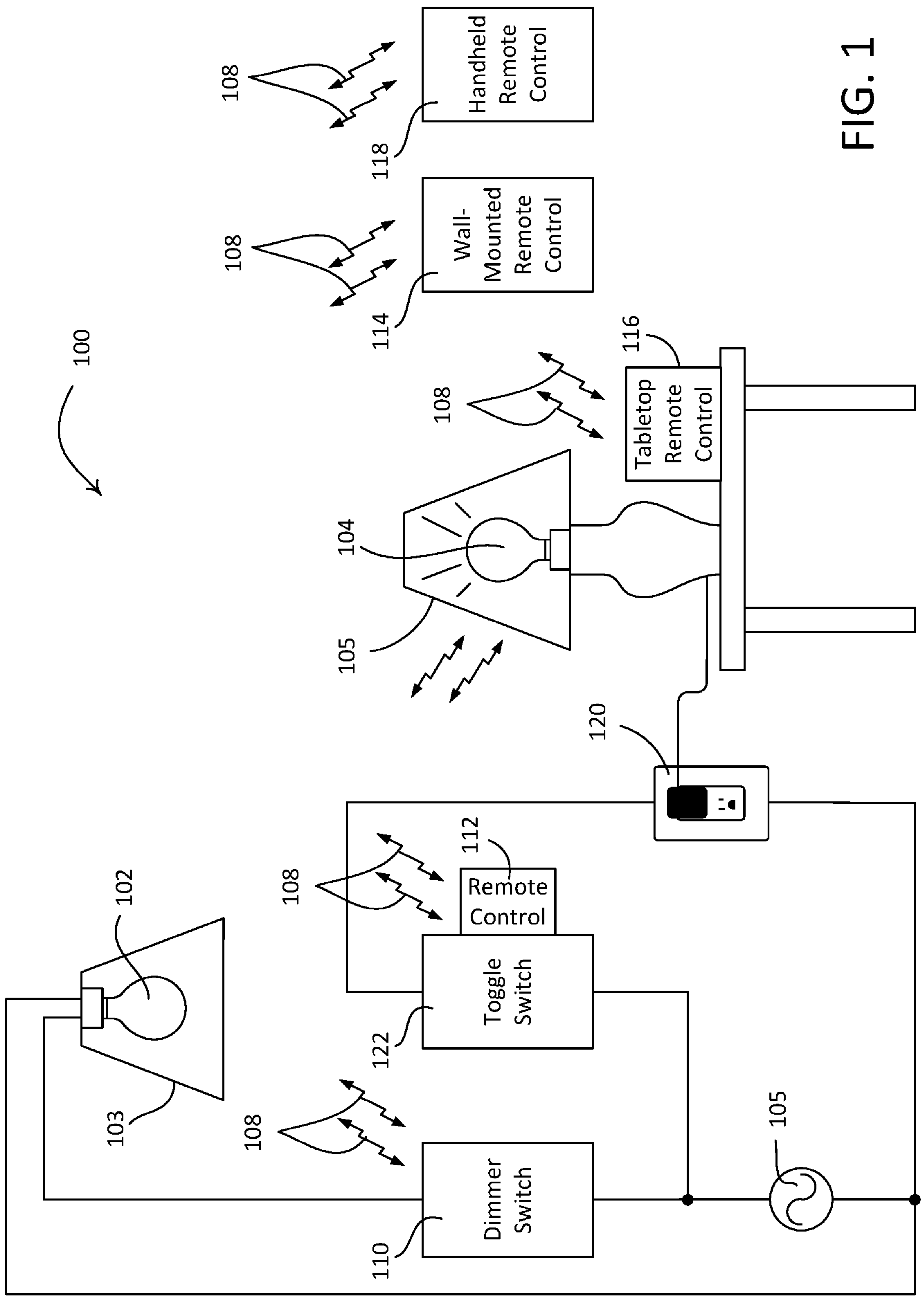
FIG. 1 depicts an example load control system that includes one or more example control devices.

FIG. 1 is a simplified diagram of an example load control system. As shown, the load control system is configured as a lighting control system 100 for control of one or more lighting loads, such as a lighting load 102 that is installed in a ceiling-mounted downlight fixture 103 and a controllable lighting load 104 that is installed in a table lamp 105. The lighting loads 102, 104 shown in FIG. 1 may include light sources of different types (e.g., incandescent lamps, fluorescent lamps, and/or LED light sources). The lighting loads may have advanced features. For example, the lighting loads may be controlled to emit light of varying intensities and/or colors in response to a user command. The amount of power delivered to the lighting loads may be adjusted to an absolute level or by a relative amount. The lighting control system 100 may be configured to control one or more of the lighting loads (e.g., and/or other electrical loads) according to one or more configurable presets or scenes. These presets or scenes may correspond to, for example, predefined light intensities and/or colors, predefined entertainment settings such as music selection and/or volume settings, predefined window treatment settings such as positions of shades, predefined environmental settings such as heating, ventilation, and air conditioning (HVAC) settings, or any combination thereof. The presets or scenes may correspond to one or more specific electrical loads (e.g., bedside lamps, ceiling lights, etc.) and/or one or more specific locations (e.g., a room, an entire house, etc.).

The lighting load 102 may be an example of a lighting load that is wired into a power control and/or delivery path of the lighting control system 100. As such, the lighting load 102 may be controllable by a wall-mounted control device such as a dimmer switch. The lighting load 104 may be an example of a lighting load that is equipped with integral load control circuitry and/or wireless communication capabilities such that the lighting load may be controlled via a wireless control mechanism (e.g., by a remote control device).

The lighting control system 100 may include one or more control devices for controlling the lighting loads 102, 104 (e.g., controlling an amount of power delivered to the lighting loads). The lighting loads 102, 104 may be controlled substantially in unison, or be controlled individually. For example, the lighting loads may be zoned so that the lighting load 102 may be controlled by a first control device, while the lighting load 104 may be controlled by a second control device. The control devices may be configured to turn the lighting loads 102, 104 on and off. The control devices may be configured to control the magnitude of a load current conducted through the lighting loads (e.g., so as to control an intensity of the lighting loads 102, 104 between a low-end intensity LLE and a high-end intensity Um). The control devices may be configured to control an amount of power delivered to the lighting loads to an absolute level (e.g., to a maximum allowable amount), or by a relative amount (e.g., an increase of 10% from a current level). The control devices may be configured to control a color of the lighting load 102, 104 (e.g., by controlling a color temperature of the lighting loads or by applying full color control over the lighting loads).

The control devices may be configured to activate a preset associated with the lighting load 102, 104 (e.g., a preset may be associated with one or more predetermined settings of the lighting loads such as an intensity level of the lighting loads and/or a color of the lighting loads). The presets may be configured via the control device and/or via an external device (e.g., a mobile device) by way of a wireless communication circuit of the control device. The control devices may be configured to activate control of a zone. A zone may correspond to one or more electrical loads that are configured to be controlled by the control devices. A zone may be associated with a specific location (e.g., a living room) or multiple locations (e.g., an entire house with multiple rooms and hallways). The control devices may be configured to switch between different operational modes. An operational mode may be associated with controlling different types of electrical loads or different operational aspects of one or more electrical loads. Examples of operational modes may include a lighting control mode for controlling one or more lighting loads (e.g., which in turn may include a color control mode and an intensity control mode), an entertainment system control mode (e.g., for controlling music selection and/or the volume of an audio system), an HVAC system control mode, a winter treatment device control mode (e.g., for controlling one or more shades), and/or the like.

The control device described herein may be, for example, a dimmer switch 110, a retrofit remote control device 112, a wall-mounted control device 114, a tabletop remote control device 116, and/or a handheld remote control device 118, as shown in FIG. 1. The dimmer switch 110 may include a base portion (e.g., such as one or more of a yoke, a bezel, and an enclosure that may house electrical circuitry and or mechanical complements of the dimmer switch 110) that is configured to be mounted to a standard electrical wallbox. Once mounted, the dimmer switch 110 may be coupled in series electrical connection between an alternating-current (AC) power source 105 and a lighting load that is wired into the control path of the dimmer switch 110 (e.g., such as the lighting load 102). The dimmer switch 110 may receive an AC mains line voltage $V_{AC}$ from the AC power source 105, and may generate a control signal for controlling the lighting load 102. The control signal may be generated via various phase-control techniques (e.g., a forward phase-control dimming technique or a reverse phase-control dimming technique). The dimmer switch 110 may be configured to receive wireless signals (e.g., from a remote control device) representative of commands to control the lighting load 102, and generate respective control signals for executing the commands. Examples of wall-mounted dimmer switches are described in greater detail with reference to FIG. 13, and in commonly-assigned U.S. Pat. No. 7,242,150, issued Jul. 10, 2007, entitled DIMMER HAVING A POWER SUPPLY MONITORING CIRCUIT; U.S. Pat. No. 7,546,473, issued Jun. 9, 2009, entitled DIMMER HAVING A MICROPROCESSOR-CONTROLLED POWER SUPPLY; and U.S. Pat. No. 8,664,881, issued Mar. 4, 2014, entitled TWO-WIRE DIMMER SWITCH FOR LOW-POWER LOADS, the entire disclosures of which are hereby incorporated by reference.

The retrofit remote control device 112 may be configured to be mounted to a mechanical switch (e.g., a toggle switch 122, a paddle switch, a pushbutton switch, and/or other suitable switch) that may be pre-existing in the lighting control system 100. Such a retrofit solution may provide energy savings and/or advanced control features, for example without requiring significant electrical re-wiring and/or without requiring the replacement of existing mechanical switches. As an example, a consumer may replace an existing lamp with the controllable lighting load 104, switch a toggle switch 122 that is coupled to the lighting load 104 to the on position, install (e.g., mount) the remote control device 112 onto the toggle switch 122, and associate the remote control device 112 with the lighting source 104. The retrofit remoted control 112 may then be used to perform advanced functions that the toggle switch 122 may be incapable of performing (e.g., such as dimming the intensity level of the light output, changing the color of the light output, providing feedback to a user, etc.). As shown, the toggle switch 122 is coupled (e.g., via a series electrical connection) between the AC power source 105 and an electrical receptacle 120 into which the lighting load 104 may be plugged (e.g., as shown in FIG. 1). Alternative, the toggle switch 122 may be coupled between the AC power source 105 and one or more of the lighting loads 102, 104, without the electrical receptacle 120.

The wall-mounted remote control device 114 may be configured to be mounted to a standard electrical wallbox and be electrically connected to the AC power source 105 for receiving power. The wall-mounted remote control device 114 may be configured to receive a user input and may generate and transmit a control signal (e.g., control data such as a digital message) for controlling the lighting loads 102, 104 in response to the user input. The tabletop remote control device 116 may be configured to be placed on a surface (e.g., an end table or night stand), and may be powered by a direct-current (DC) power source (e.g., a battery or an external DC power supply plugged into an electrical outlet). The tabletop remote control device 116 may be configured to receive a user input, and may generate and transmit a signal (e.g., a digital message) for controlling the lighting loads 102, 104 in response to the user input. The handheld remote control device 118 may be sized to fit into a user's hand, and may be powered by a direct-current (DC) power source (e.g., a battery or an external DC power supply plugged into an electrical outlet). The handheld remote control device 118 may be configured to receive a user input, and may generate and transmit a signal (e.g., a digital message) for controlling the lighting loads 102, 104 in response to the user input. Examples of battery-powered remote controls are described in greater detail in commonly assigned U.S. Pat. No. 8,330,638, issued Dec. 11, 2012, entitled WIRELESS BATTERY POWERED REMOTE CONTROL HAVING MULTIPLE MOUNTING MEANS, and U.S. Pat. No. 7,573,208, issued Aug. 11, 2009, entitled METHOD OF PROGRAMMING A LIGHTING PRESET FROM A RADIO-FREQUENCY REMOTE CONTROL, the entire disclosures of which are hereby incorporated by reference.

The control devices described herein (e.g., the dimmer switch 110 and/or remote control devices 112-118) may each include a user input unit. The user input unit may be configured to receive (e.g., detect) user inputs for controlling one or more of the lighting loads 102, 104, and/or the control device itself. A plurality of mechanisms for receiving the user inputs may be implemented on the user input unit, including, for example, a rotating mechanism (e.g., such as a rotary knob or a dial), a button or switch or an imitation thereof, and a touch sensitive device (e.g., such as a capacitive touch surface) configured to detect both point actuations and gestures.

The control devices described herein (e.g., the dimmer switch 110 and/or remote control devices 112-118) may each include one or more visual indicators (e.g., a light bar) configured to be illuminated by one or more light sources (e.g., one or more LEDs). The one or more visual indicators may be provided on the user input unit or may be separate from the user input unit. The one or more visual indicators may be operable to provide feedback to a user of the control device. Such feedback may indicate, for example, a status of a lighting load (e.g., the lighting loads 102, 104) controlled by the control device. The status may reflect, for example, whether the lighting load is on or off, a present intensity of the lighting load, a color of the lighting load, and so on. The feedback may indicate a status of the control device itself, for example, such as a present operational mode of the control device (e.g., an intensity control mode or a color control mode), a power status of the control device (e.g., remaining battery power), and so on. As an example, the control device may provide feedback via the visual indicators while the control device is being actuated and/or after the control device is actuated. The feedback may indicate to the user that the control device is transmitting control signals (e.g., RF signals) in response to the actuation. The control device may be configured to keep the visual indicators illuminated while the condition triggering the feedback continues to exist. The control device may be configured to illuminate the visual indicators for a few seconds (e.g., 1-2 seconds) and then turn off the visual indicators (e.g., to conserve battery life).

The control devices described herein (e.g., the dimmer switch 110 and/or remote control devices 112-118) may each include a control circuit. The control circuit may be configured to be responsive to a user input received via the user input unit. The control circuit may be configured to generate control data (e.g., a control signal) for controlling the lighting loads 102, 104 in response to the user input. The control data may include commands and/or other information (e.g., device identification information) for controlling the lighting loads 102, 104. The control data may be included in a control signal transmitted to the lighting loads 102, 104 via a wireless communication circuit. The control circuit may be configured to illuminate the one or more visual indicators to provide feedback of the control being applied and/or its outcome.

The control devices described herein (e.g., the dimmer switch 110 and/or remote control devices 112-118) may each include a wireless communication circuit for transmitting and/or receiving radio frequency (RF) signals 108. The wireless communication circuit may be used to transmit a control signal that includes the control data (e.g., a digital message) generated by the control device to the lighting loads 102, 104 or to a central controller of the lighting control system 100, for example. The control data may be generated in response to a user input to adjust one or more operational aspects of the lighting loads 102, 104. The control data may include a command and/or identification information (e.g., such as a unique identifier) associated with the control device and/or one or more of the lighting loads 102, 104 (e.g., and/or other electrical loads of the load control system 100).

The control devices (e.g., the remote control devices 112-118) may be associated with one or more lighting loads and/or other control devices (e.g., the dimmer switch 110) for controlling the lighting loads (e.g., through a configuration procedure). Upon such association, the lighting loads 102, 104 may be responsive to control signals transmitted by the control devices. To illustrate, the association may be accomplished by actuating an actuator on the concerned lighting loads and/or control devices, and then actuating (e.g., pressing and holding) an actuator on the control device for a predetermined amount of time (e.g., approximately 10 seconds). Examples of a configuration procedure for associating a control device with an electrical load is described in greater detail in commonly-assigned U.S. Patent Publication No. 2008/0111491, published May 15, 2008, entitled RADIO-FREQUENCY LIGHTING CONTROL SYSTEM, the entire disclosure of which is hereby incorporated by reference. The wireless communication circuit may also be controlled to transmit/receive feedback information regarding the control device and/or the lighting loads 102, 104 via RF signals.

The control device described herein (e.g., the dimmer switch 110 and/or remote control devices 112-118) may include a memory (not shown). The memory may be used, for example, to store operational settings associated with the control device and/or the lighting loads 102, 104 (e.g., such as lighting presets and their associated light intensities and/or colors). The memory may be implemented as an external integrated circuit (IC) or as an internal circuit (e.g., as part of a control circuit).

Further, it should be appreciated that, although a lighting control system with two lighting loads is provided as an example above, a load control system as described herein may include more or fewer lighting loads, other types of lighting loads, and/or other types of electrical loads that may be configured to be controlled by the one or more control devices. For example, the load control system may include one or more of: a dimming ballast for driving a gas-discharge lamp; an LED driver for driving an LED light source; a dimming circuit for controlling the intensity of a lighting load; a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; one or more motorized interior and/or exterior shutters; a thermostat for a heating and/or cooling system; a temperature control device for controlling a set-point temperature of a heating, ventilation, and air-conditioning (HVAC) system; an air conditioner; a compressor; an electric baseboard heater controller; a controllable damper; a variable air volume controller; a fresh air intake controller; a ventilation controller; one or more hydraulic valves for use in radiators and radiant heating system; a humidity control unit; a humidifier; a dehumidifier; a water heater; a boiler controller; a pool pump; a refrigerator; a freezer; a television and/or computer monitor; a video camera; an audio system or amplifier; an elevator; a power supply; a generator; an electric charger, such as an electric vehicle charger; an alternative energy controller; and/or the like.

Figure 2A:
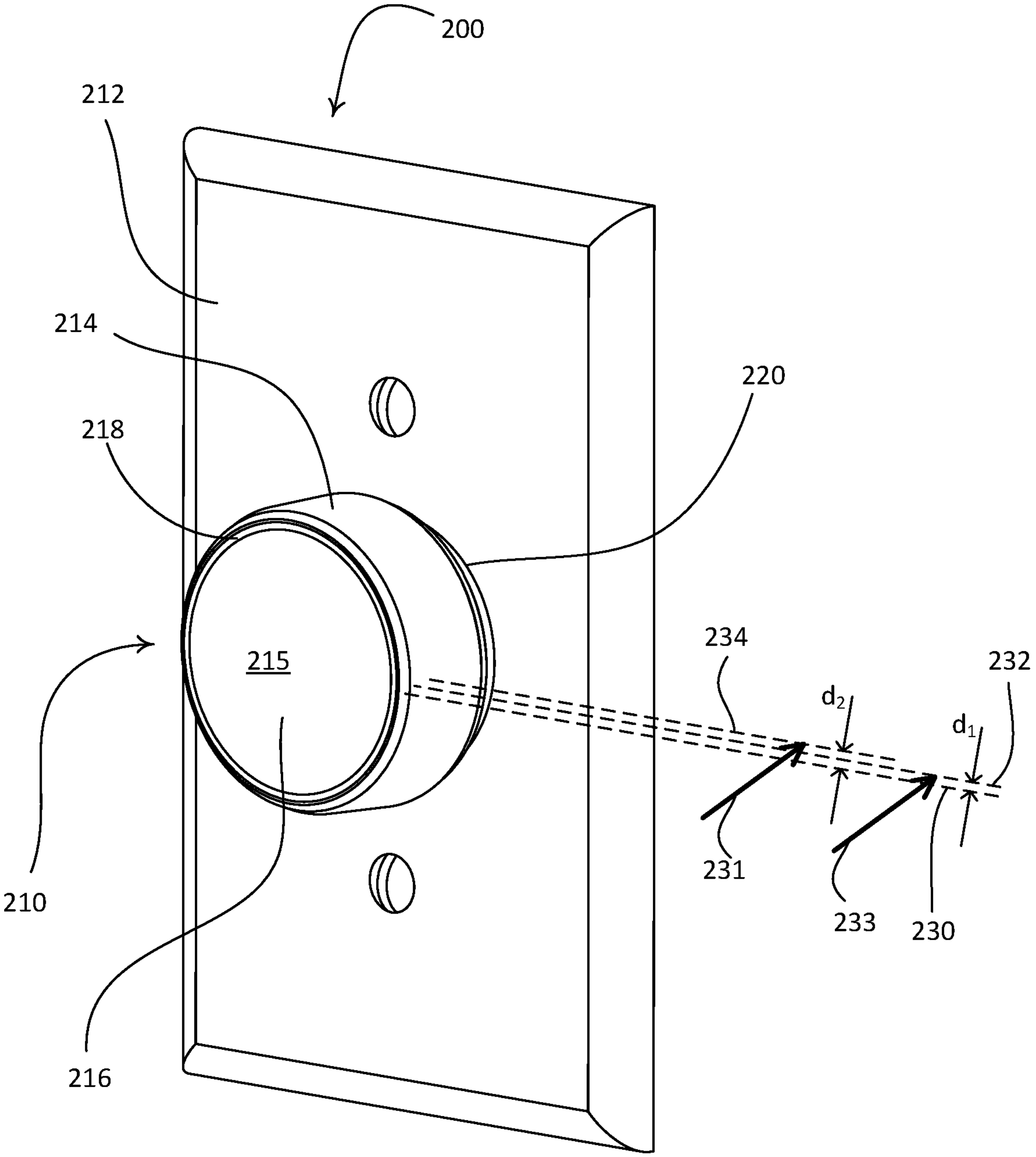
FIG. 2A is a perspective view of an example control device that may be deployed as a dimmer switch and/or a remote control device of the load control system illustrated in FIG. 1.
Figure 2B:
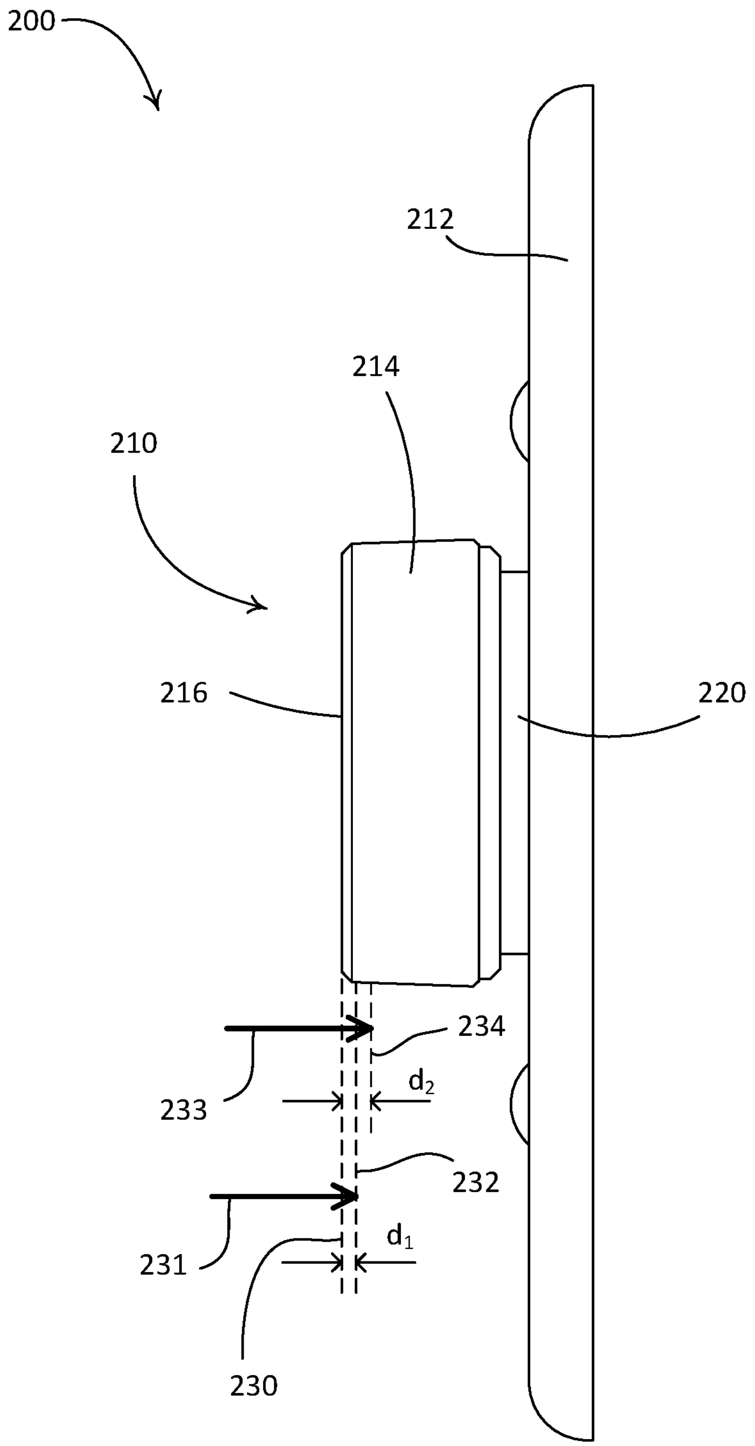
FIG. 2B is a right side view of the control device of FIG. 2A.

FIG. 2A is a perspective view and FIG. 2B is a front view of an example control device 200 that may be deployed as the dimmer switch 110 and/or the retrofit remote control device 112 in the lighting control system 100. The lighting control system 100 may include one or more lighting loads, such as the lighting loads 102, 104. The control device 200 may comprise a user interface 210 (e.g., a user input device) and a faceplate 212. The user interface 202 may include a rotating portion 214 that is rotatable with respect to the faceplate 212. For example, the rotating portion 214 may be rotatable for controlling one or more characteristics of the lighting loads controlled by the control device (e.g., adjusting the intensities and/or the colors of the lighting loads). The control device 200 may comprise a base portion 220 for rotatably supporting the rotation portion 214.

The user interface 210 may also include an actuation portion 216 defining a front surface 215 that may be pressed in towards the faceplate 212 for turning the lighting loads on and off (e.g., toggling the lighting loads). The control device 200 may be responsive to a dynamic motion of the actuation portion 216 (e.g., an actuation that causes movement of the surface of the actuation portion). The user interface 210 may also include one or more visual indicators (e.g., a light bar 218) configured to be illuminated by one or more light sources (e.g., one or more LEDs) to visibly display information, such as feedback to a user. The light bar 218 may be attached to a periphery of the actuation portion 216 and may move with the actuation portion 216 (e.g., when the actuation portion is actuated).

The front surface 215 of the actuation portion 216 may rest in an idle plane 230 (e.g., an initial plane), for example, when the actuation portion 216 is in an idle position (e.g., when a user is not pressing the actuation portion 216 towards the faceplate 212). For example, the front surface 215 of the actuation portion 216 may be biased to the idle plane 230. As shown in FIGS. 2A and 2B, the actuation portion 216 may be pressed towards the faceplate 212 through a plurality of different planes. The control device 200 may be responsive to a first-depth actuation 231 of the front surface 215 of the actuation portion 216, during which the front surface 215 of the actuation portion 216 may be pressed in by a first distance $d_1$ (e.g., a first depth), such that the front surface 215 of the actuation portion 216 resides in a first plane 232 (e.g., at a first detent). The control device 200 may be responsive to a second-depth actuation 233 of the front surface 215 of the actuation portion 216, during which the front surface 215 of the actuation portion 216 may be pressed in by a second distance $d_2$ (e.g., a second depth), such that the front surface 215 of the actuation portion 216 resides in a second plane 234 (e.g., at a second detent). The idle plane 230, the first plane 232, and the second plane 234 may be parallel with one another. The control device 200 may operate differently based on the depth (e.g., the first distance $d_1$ or the second distance $d_2$) by which the actuation portion 216 is pressed towards the faceplate 212 (e.g., depending on which of the first-depth actuation 231 or the second-depth actuation 233 is applied to the front surface 215 of the actuation portion 216). For example, the control device 200 may control different characteristics of the lighting loads and/or change operating modes based on which of the first-depth actuation 231 or the second-depth actuation 233 is applied to the front surface 215 of the actuation portion 216.

The control device 200 may provide feedback using the light bar 218 to assist the user in determining the depth at which to actuate the front surface 215 of the actuation portion 216 to apply the first-depth actuation 231 or the second-depth actuation 233 (e.g., such that the front surface 215 resides in the first plane 232 or the second plane 234, respectively). For example, the light bar 218 may be illuminated half way around the rotating portion 214 when the actuation portion 216 is pressed into the first plane 232 (e.g., by the first distance $d_1$), and illuminated entirely around the rotating portion 214 when the actuation portion is pressed into the second plane 234 (e.g., by the second distance $d_2$). Of course, if the actuation portion 216 is configured to be pressed into more than two planes, then an associated portion of the light bar 218 may be illuminated for each plane (e.g., detent), for example, one third, two thirds, and the entire light bar 218 if there are three planes in which the front portion 215 of the actuation portion 216 may reside.

The control device 200 may operate differently based on how long the front surface 215 of the actuation portion 216 is held in one of the first plane 232 and/or the second plane 234 (e.g., depending upon the length of the first-depth actuation 231 and/or the second-depth actuation 233). For example, the control device 200 may transmit a command to the turn one or more lighting loads on or off if the front surface 215 of the actuation portion 216 is held in one of the first plane 232 and/or the second plane 234 for less than a first predetermined amount of time (e.g., approximately three seconds). The control device 200 may be configured to cause a present intensity level of one or more lighting loads to be stored as a preset intensity level if the front surface 215 of the actuation portion 216 is held in the first plane 232 (e.g., the first-depth actuation 231) for the first predetermined amount of time. The control device 200 may be configured to provide a preset animation (e.g., by causing the entire light bar 218 to blink quickly) after causing the preset intensity level to be stored. In addition, the control device 200 may be configured to cause the control device to change modes of operation (e.g., between a lighting control mode and a color control mode) if the front surface 215 of the actuation portion 216 is held in the first plane 232 (e.g., the first-depth actuation 231) for a second predetermined amount of time (e.g., approximately six seconds). Further, the control device 200 may be configured to cause the control device to transmit a particular command for controlling the one or more lighting loads (e.g., a long fade-to-off command) if the front surface 215 of the actuation portion 216 is held in the first plane 232 (e.g., the first-depth actuation 231) for the first predetermined amount of time, and then pressed in further and held in the second plane 234 (e.g., the second-depth actuation 233) for the remainder of the second predetermined amount of time.

The control device 200 may be configured to cause the control device to be associated with one or more lighting loads and/or other control devices (e.g., the dimmer switch 110) if the front surface 215 of the actuation portion 216 is held in the second plane 234 (e.g., the second-depth actuation 233). For example, the control device 200 may be configured to cause the control device to enter an association mode (e.g., to initiate an association procedure) if the front surface 215 of the actuation portion 216 is held in the second plane 234 for the first predetermined amount of time. The control device 200 may be configured to provide an association animation (e.g., by causing the entire light bar 218 to blink or strobe) while in the association mode. The control device 200 may be configured to cause the control device to complete the association procedure (e.g., to be associated with the one or more lighting loads and/or other control devices) and exit the association mode if the front surface 215 of the actuation portion 216 is held in the second plane 234 for the second predetermined amount of time.

The control device 200 may change and/or cycle through operating modes based on how long the actuation portion 216 is held in one of the first plane 232 and/or the second plane 234. The operating modes may, for example, configure the control device 200 to control different characteristics of the lighting loads (e.g., intensity, color, etc.) in response to rotations of the rotating portion 214, and/or cause the control device 200 to enter one or more advanced modes. For example, in one operating mode, rotations of the rotating portion 214 may cause the control device 200 to control the intensity of the lighting loads, while in another operating mode, rotations of the rotating portion 214 may cause the control device to control the color of the lighting loads. Further, when in an advanced mode, the control device 200 may be configured to program presets (e.g., lighting presets), associate the control device 200 to one or more lighting loads and/or a system controller, and/or perform more advanced control of the lighting loads (e.g., fade to on, fade to off, etc.). Finally, it should be appreciated that although the control device 200 is described with reference to the control of lighting loads, the control device 200 may be configured to control characteristics of other electrical loads in addition or in lieu of lighting loads (e.g., volume of speakers, position of motorized window treatments, etc.).

Further, the control device 200 may control different characteristics of the lighting loads based on the depth (e.g., the first distance $d_1$ or the second distance $d_2$) to which the front surface 215 of the actuation portion 216 is pressed towards the faceplate 212. For example, the control device 200 may control a first characteristic of the lighting loads if the front surface 215 of the actuation portion 216 is pressed towards the faceplate 212 by the first distance $d_1$ into the first plane 232, and control a second characteristic of the lighting loads if the front surface 215 of the actuation portion 216 is pressed towards the faceplate 212 by the second distance $d_2$ into the second plane 234. Accordingly, the control device 200 may be configured to treat each detent (e.g., each of the first and second planes 232, 234 in which the front surface 215 of the actuation portion 216 may reside) as a separate actuator. Further, the control device 200 may be configured to determine how long the front surface 215 of the actuation portion 216 is pressed into a particular one of the first and second planes 232, 234, and for example, operate differently based on how long the front surface 215 of the actuation portion 216 is pressed into a particular one of the first and second planes 232, 234. For example, the control device 200 may be configured to determine whether the front surface 215 of the actuation portion 216 is pressed into a particular one of the first and second planes 232, 234 for a plurality of different durations (e.g., less than 1 second, greater than 3 seconds, greater than 6 seconds, greater than 9 seconds, etc.).

The control device 200 may, in some examples, be configured to wake the control device 200 from a sleep state upon detecting the first-depth actuation 231 of the actuation portion 216 (e.g., the front surface 215 of the actuation portion 216 being pressed into the first plane 232). Upon detecting the first-depth actuation 231 of the actuation portion 216, the control device 200 may illuminate the light sources (e.g., the light bar 218) of the control device 200, determine whether there are any lighting loads associated with the control device 200, and/or send out a message to any associated lighting loads asking for their present intensities level. If the control device 200 determines that the lighting loads are off, the control device 200 may send out a command to the lighting loads to turn them on (e.g., turn on the lighting loads to a preset level). If the control device 200 determines that the lightings loads are on, the control device 200 may start a timer to determine whether the front surface 215 of the actuation portion 216 is being held in the first plane 232 and/or the second plane 234 for a first amount of time (e.g., three seconds). The control device 200 may operate differently based on which plane 232, 234 the front surface 215 of the actuation portion 216 is held and/or for how long the actuation portion 216 is held in one of the planes 232, 234 (e.g., as described with reference to FIGS. 8A and 8B).

Figure 3:
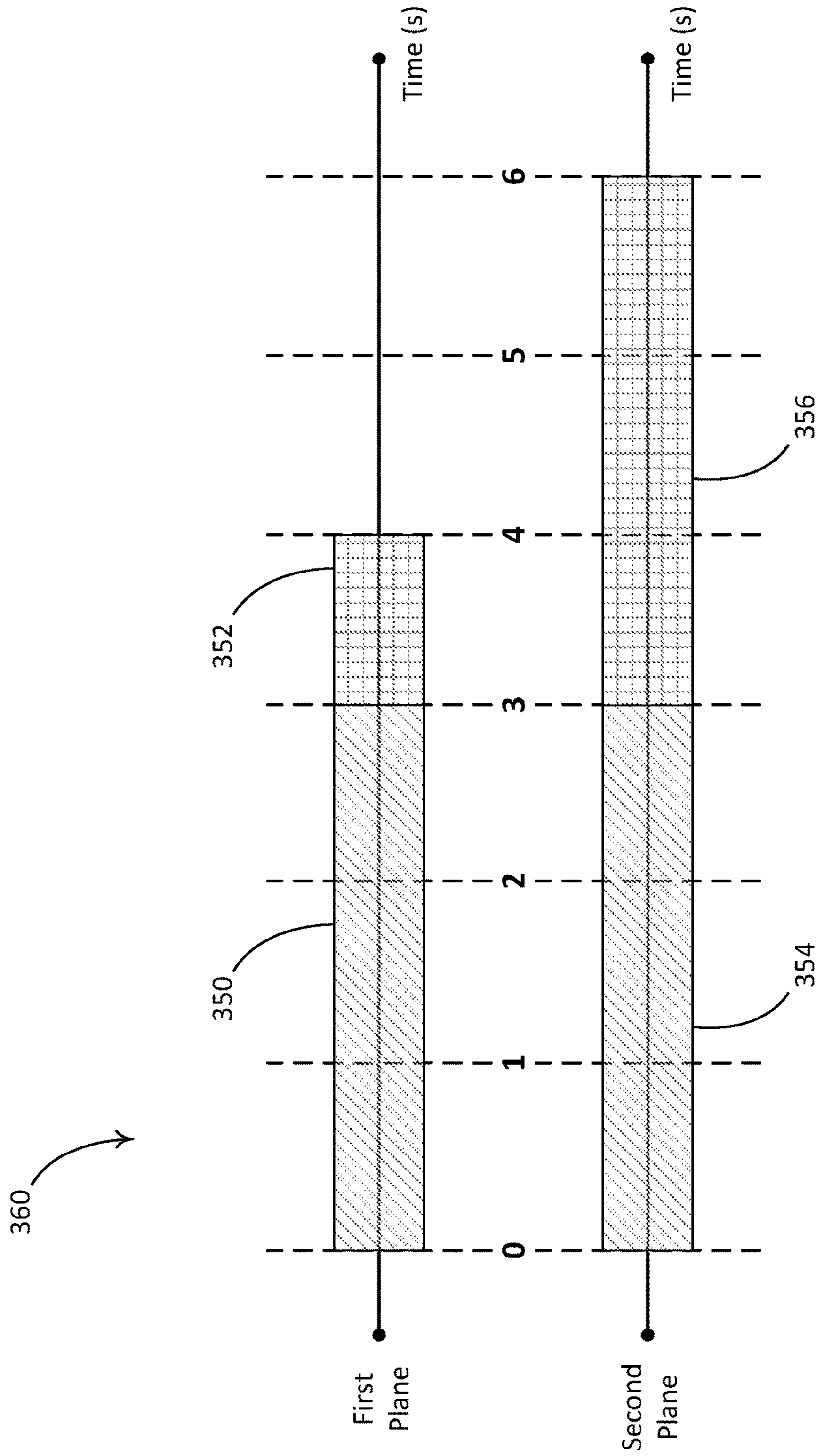
FIG. 3 is an example diagram illustrating how a control device (e.g., the control device 200) may operate based on how deep and how long an actuation portion (e.g., the action portion 216) is pressed towards the faceplate.

FIG. 3 is an example diagram 360 illustrating how a control device (e.g., the control device 200) may operate based on how deep and how long a front surface of an actuation portion (e.g., the front surface 215 of the actuation portion 216) is pressed towards a faceplate of the control device. The control device may be configured to perform a first operation (e.g., toggle the lighting load between on and off) if the front surface of the actuation portion is pressed into a first plane (e.g., the first plane 232) for less than a first predetermined amount of time (e.g., pressed into the first plane and released before the end of a first time period 350). For example, the first predetermined amount of time (e.g., and the length of the first time period 350) may be approximately three seconds. If the front surface of the actuation portion is pressed into the first plane for greater than the first predetermined amount of time, then the control device may perform a second operation 352 (e.g., save the present intensity of one or more lighting loads as a preset intensity). The control device may be configured to provide a preset animation (e.g., by causing one or more fgtas to blink quickly) for a second time period 352 after the first time period 350. For example, the length of the second time period 352 may be approximately one second.

Similarly, the control device may be configured to perform a third operation (e.g., toggle the lighting load between on and off) if the front surface of the actuation portion is pressed into a second plane (e.g., the second plane 234) for less than the first predetermined amount of time (e.g., pressed into the second plane and released before the end of a third time period 354). If the front surface of the actuation portion is pressed into the second plane for greater than the first predetermined amount of time, the control device may configure to perform a fourth operation (e.g., enter an association mode for associating the control device to one or more lighting loads and/or other control devices). The control device may be configured to provide an association animation (e.g., by causing one or more visual indicators to blink or strobe) for a fourth time period 356 after the third time period 354. For example, the length of the fourth time period 356 may be approximately three seconds. If the front surface of the actuation portion is pressed into the second plane for greater than a second predetermined amount of time, then the control device may configure to perform a fifth operation (e.g., associate the control device to the one or more lighting loads and/or other control devices). It should be appreciated that different operations of the actuation portion may result in the same response by the control device. Further, although not illustrated, the control device maybe configured to perform additional operations if the actuation portion is pressed into one plane for a particular amount of time and then into another plane (e.g., if the actuation portion is pressed into the first plane for greater than three seconds and then pressed into the second plane). This allows, for example, for a control device with a single actuator to provide increased levels of use control.

Figure 4B:
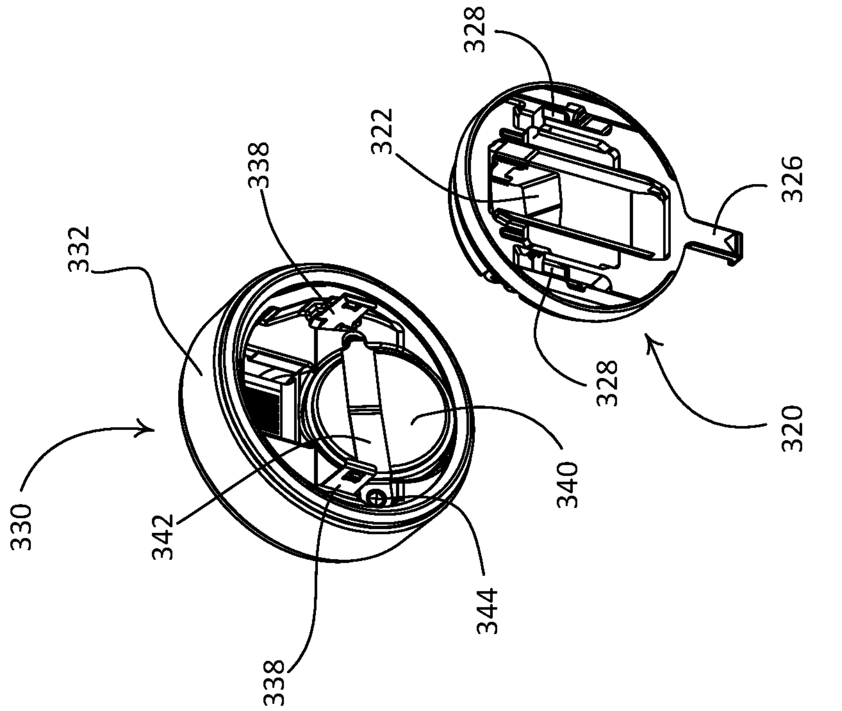
FIG. 4B are rear views of the control unit and the base portion of the remote control device depicted in FIG. 4A.
Figure 4A:
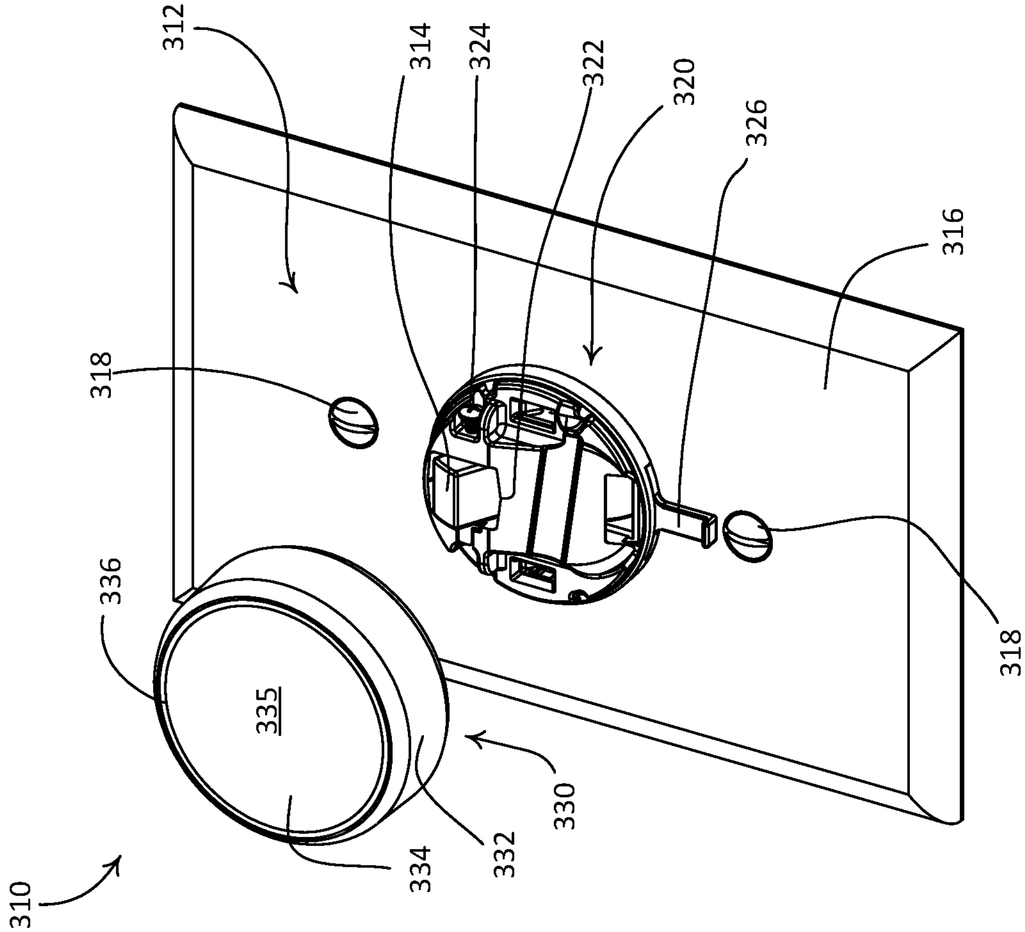
FIG. 4A is a perspective view of an example remote control device that may be deployed as a remote control device of the load control system illustrated in FIG. 1 with a control unit detached from a base portion.

FIGS. 4A and 4B are front and rear exploded perspective views of another example remote control device 310 that may be deployed as the retrofit remote control device 112 in the lighting control system 100 shown in FIG. 1 and/or the control device 200 shown in FIG. 2. The remote control device 310 may be configured to be mounted over an actuator of a standard light switch 312 (e.g., a toggle actuator of a single pole single throw (SPST) maintained mechanical switch). The remote control device 310 may be installed over of an existing faceplate 316 that is mounted to the light switch 312 (e.g., via faceplate screws 318). The remote control device 310 may include a base portion 320 and a control unit 330 that may be operably coupled to the base portion 320. The control unit 330 may be supported by the base portion 320 and may include a rotating portion 332 (e.g., an annular rotating portion) that is rotatable with respect to the base portion 320.

As shown in FIG. 4A, the control unit 330 may be detached from the base portion 320. The base portion 320 may be attached (e.g., fixedly attached) to a toggle actuator 314 and may be configured to maintain the toggle actuator 314 in the on position. The toggle actuator 314 may be received through a toggle actuator opening 322 in the base portion 320. A screw 324 may be tightened to attach (e.g., fixedly attached) the base portion 320 to the toggle actuator 314. In this regard, the base portion 320 may be configured to prevent a user from inadvertently switching the toggle actuator 314 to the off position when the remote control device 310 is attached to the light switch 312.

The control unit 330 may be released from the base portion 320. For example, a control unit release tab 326 may be provided on the base portion 320. By actuating the control unit release tab 326 (e.g., pushing up towards the base portion or pulling down away from the base portion), a user may remove the control unit 330 from the base portion 320.

The control unit 330 may comprise one or more clips 338 that may be retained by respective locking members 328 connected to the control unit release tab 326 when the base portion 320 is in a locked position. The one or more clips 338 may be released from the respective locking members 328 of the base portion 320 when the control unit release tab 326 is actuated (e.g., pushed up towards the base portion or pulled down away from the base portion) to put the base portion 320 in an unlocked position. In an example, the locking members 328 may be spring biased into the locked position and may automatically return to the locked position after the control unit release tab 326 is actuated and released. In an example, the locking members 328 may not be spring biased, in which case the control unit release tab 326 may be actuated to return the base portion 320 to the locked position.

The control unit 330 may be installed on the base portion 320 without adjusting the base portion 320 to the unlocked position. For example, the one or more clips 338 of the control unit 330 may be configured to flex around the respective locking members 328 of the base portion and snap into place, such that the control unit 330 is fixedly attached to the base portion.

The control unit 330 may be released from the base portion 320 to access one or more batteries 340 (e.g., as shown in FIG. 4B) that provides power to at least the remote control device 310. The batteries 340 may be held in place in various ways. For example, the batteries 340 may be held by a battery retention strap 342, which may also operate as an electrical contact for the batteries. The battery retention strap 342 may be loosened by untightening a battery retention screw 344 to allow the batteries 340 to be removed and replaced. Although FIG. 4B depicts the batteries 340 as being located in the control unit 330, it should be appreciated that the batteries 340 may be placed elsewhere in the remote control device 310 (e.g., in the base portion 320) without affecting the functionality of the remote control device 310.

When the control unit 330 is coupled to the base portion 320, the rotating portion 332 may be rotatable in opposed directions about the base portion 320 (e.g., in the clockwise and/or counter-clockwise directions). The base portion 320 may be configured to be mounted over the toggle actuator 314 of the switch 312 such that the rotational movement of the rotating portion 332 may not change the operational state of the toggle actuator 314 (e.g., the toggle actuator 314 may remain in the on position to maintain functionality of the remote control device 310).

The control unit 330 may comprise an actuation portion 334 defining a front surface 335. The actuation portion 334 may in turn comprise a part or an entirety of a front surface of the control unit 330. For example, the control unit 330 may have a circular surface within an opening defined by the rotating portion 332. The actuation portion 334 may comprise a part of the circular surface (e.g., a central area of the circular surface) or approximately the entire circular surface. The actuation portion 334 may be received in a central circular opening defined by the rotating portion 332. In an example, the actuation portion 334 may be configured to move towards the light switch 312 (e.g., through the central opening of the rotation portion 332) to actuate a mechanical switch (not shown) inside the control unit 330 as will be described in greater detail below. The actuation portion 334 may return to an idle position after being actuated. In addition, the rotating portion 332 may be connected to the actuation portion 334 and may move with the actuation portion to actuate the mechanical switch when the actuation portion 332 is actuated.

When the actuation portion 334 is in the idle position, the front surface 335 of the actuation portion 334 may be located in an idle plane that may be parallel to a front surface of the faceplate 312 (e.g., such as the idle plane 230 shown in FIGS. 2A and 2B). The rotating portion 332 and/or the actuation portion 334 may be pushed into towards the base portion 320 to cause the front surface 335 of the actuation portion 334 to be pressed in by a first distance (e.g., such as the first distance $d_1$) towards the base portion 320 (e.g., the first-depth actuation 231), such that the front surface 335 of the actuation portion 334 resides in a first plane (e.g., such as the first plane 232). For example, the first plane may be parallel to the front surface of the faceplate 312 and closer to the faceplate than the idle plane. In addition, the rotating portion 332 and/or the actuation portion 334 may pressed in by a second distance (e.g., such as the second distance $d_2$) towards the base portion 320 (e.g., the second-depth actuation 233), such that the front surface 335 of the actuation portion 334 resides in a second plane (e.g., such as the second place 234). For example, the second plane may be parallel to the front surface of the faceplate 312 and closer to the faceplate than the first plane.

The remote control device 310 may be configured to transmit one or more wireless communication signals (e.g., the RF signals 108 of FIG. 1) to an electrical load (e.g., the lighting loads 102, 104 of the lighting control system 100 of FIG. 1). The remote control device 310 may include a wireless communication circuit (e.g., an RF transceiver or transmitter (not shown)) via which one or more wireless communication signals may be sent and/or received. The control unit 330 may be configured to transmit messages (e.g., digital messages including commands to control the controllable electrical load) via the wireless communication signals. The control circuit 330 may be configured to transmit different messages and/or commands depending upon which of the first-depth actuation or the second-depth actuation is applied to the front surface 335 of the actuation portion 336. For example, when the front surface 335 of the actuation portion 334 is actuated into the first plane, the control unit 330 may be configured to transmit a command, via the wireless communication circuit, to raise the intensity of a controllable lighting load in response to a clockwise rotation of the rotating portion 332 and to transmit a command to lower the intensity of the controllable light source in response to a counterclockwise rotation of the rotating portion 332. In addition, when the front surface of the actuation portion 334 is in the second plane, the control unit 330 may be configured to transmit a command, via the wireless communication circuit, to adjust the color (e.g., the color temperature) of the controllable light source in response to clockwise and counterclockwise rotations of the rotating portion 332.

The control unit 330 may be configured to transmit a command to toggle an electrical load (e.g., from off to on or vice versa) in response to an actuation of the actuation portion 334. In addition, the control unit 330 may be configured to transmit a command to turn an electrical load on in response to an actuation of the actuation portion 334 (e.g., if the control unit 330 possesses information indicating that the electrical load is presently off). The control unit 330 may be configured to transmit a command to turn an electrical load off in response to an actuation of the actuation portion 334 (e.g., if the control unit possesses information indicating that the electrical load is presently on).

The control unit 330 may be configured to transmit a command to turn an electrical load on to a maximum power level (e.g., to turn a light source on to full intensity) in response to a double tap of the actuation portion 334 (e.g., two actuations in quick succession). The control unit 330 may be configured to adjust the power level of an electrical load to a minimum level (e.g., to turn the intensity of a lighting load to a minimum intensity) in response to rotation of the rotating portion 332 and may only turn off the electrical load in response to an actuation of the actuation portion 334. The control unit 330 may also be configured in a spin-to-off mode, in which the control unit 330 may turn off an electrical load after the power level of the electrical load (e.g., intensity of the lighting load) is controlled to a minimum level in response to a rotation of the rotating portion 332 (e.g., without an actuation of the actuation portion).

The control unit 330 may comprise one or more visual indicators (e.g., a light bar 336) that may be illuminated by one or light sources (e.g., LEDs), for example, to provide feedback to a user of the remoted control device 310. The light bar 336 may be located in different areas of the remote control device 310 in different implementations. For example, the light bar 336 may be located between the rotating portion 332 and the actuation portion 334, and/or extend along the perimeter of the rotating portion 332 or the actuation portion 334. The light bar 336 may have different shapes. For example, the light bar 336 may form a full circle (e.g., a substantially full circle) as shown in FIG. 4A, a partial circle, a linear light bar, and/or the like. The light bar 336 may be attached to a periphery of the actuation portion 334 and move with the actuation portion 334 (e.g., when the actuation portion is actuated). The light bar 336 may have a certain width (e.g., a same width along the entire length of the light bar). The exact value of the width may vary, for example, depending on the size of the remote control device 310 and/or the intensity of the light source(s) that illuminates the light bar 336.

Figure 4C:
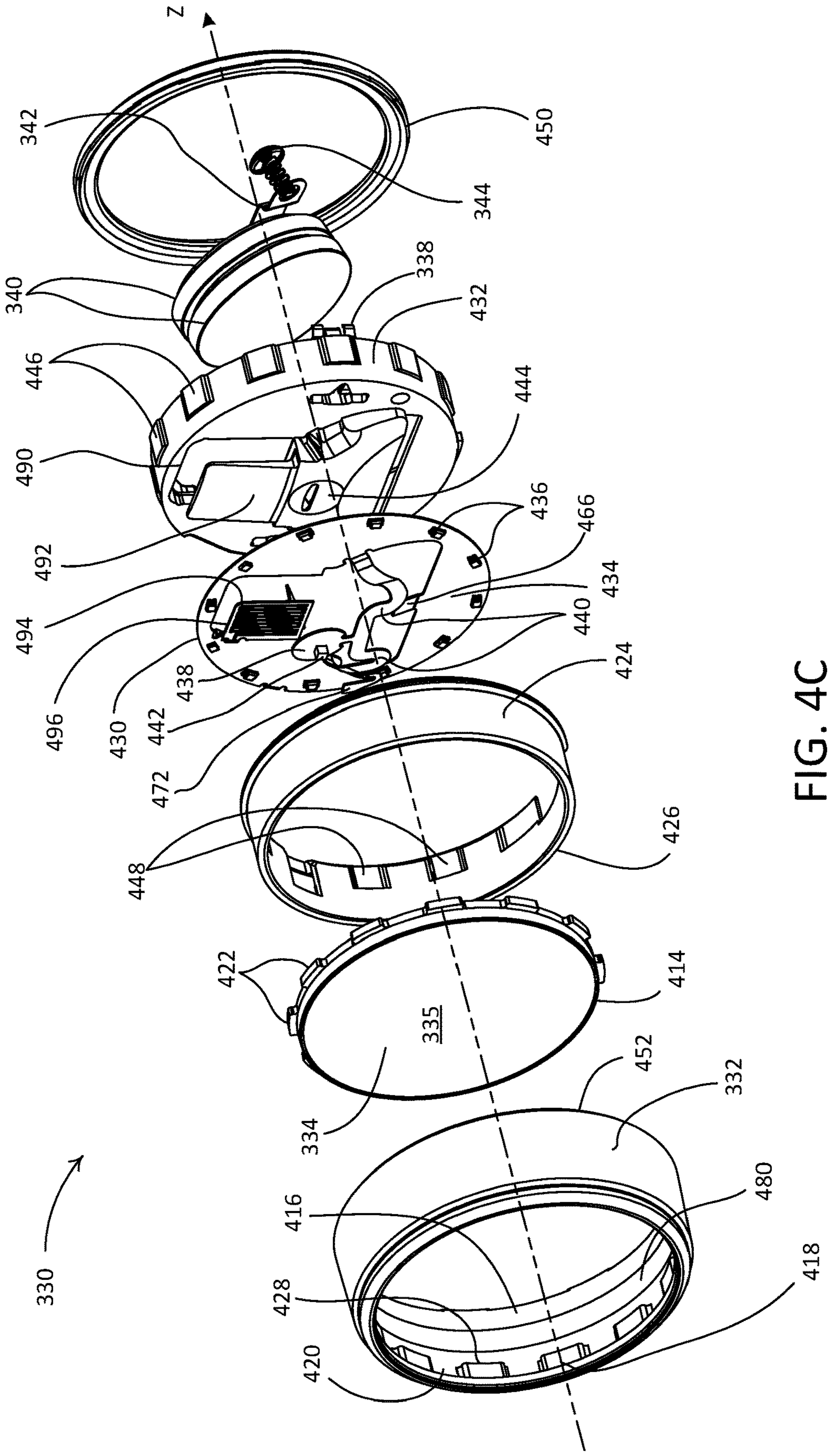
FIG. 4C is a front exploded view of the control unit for the remote control device depicted in FIG. 4A.
Figure 4D:
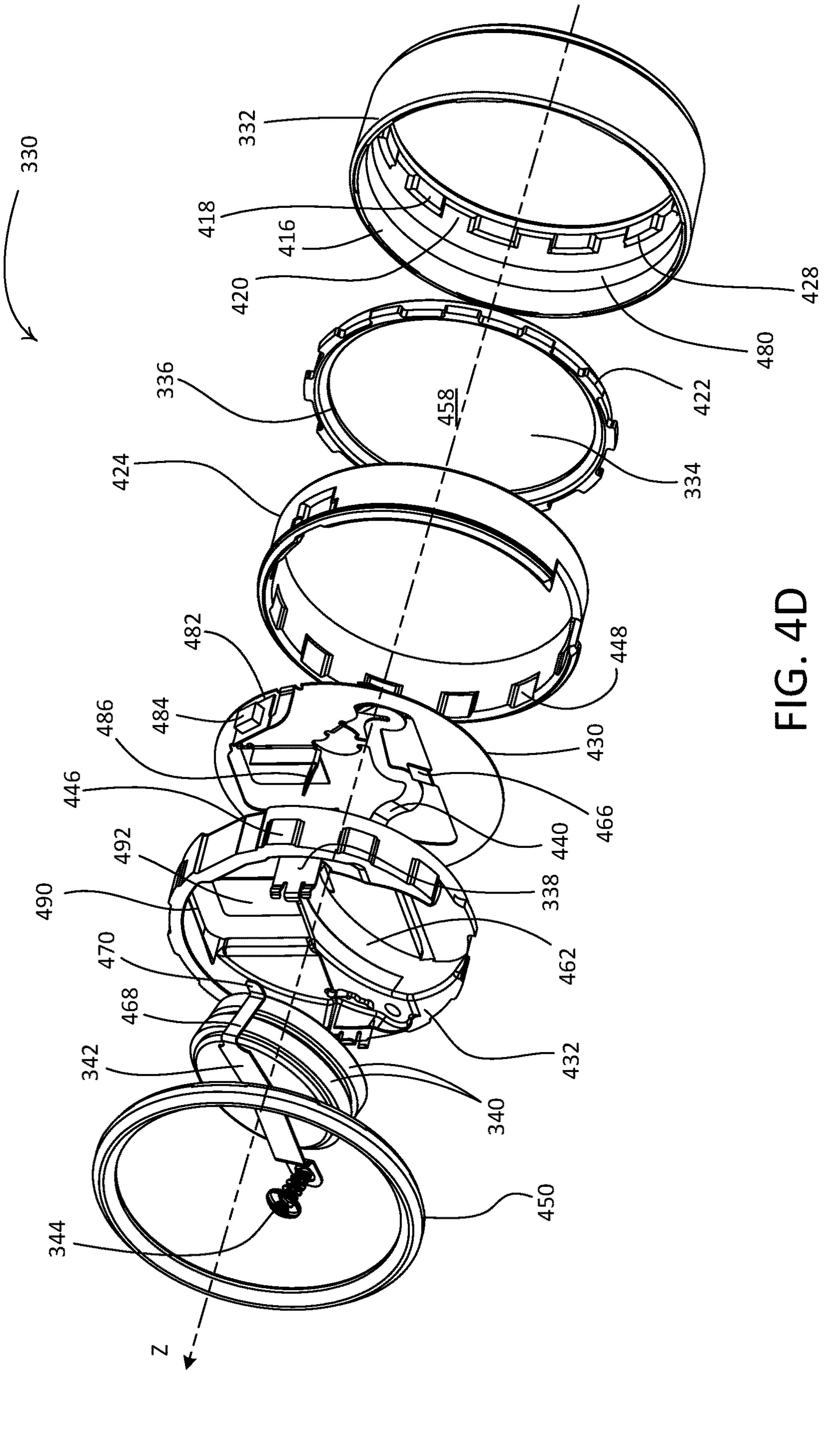
FIG. 4D shows a rear exploded view of the control unit for the example remote control device depicted in FIG. 4C.

FIG. 4C is a front exploded view and FIG. 4D is a rear exploded view of the control unit 330 of the remote control device 310. The actuation portion 334 may be received within an opening defined by the rotating portion 332. The light bar 336 may be attached to the actuation portion 334 around a periphery of the actuation portion. The rotating portion 332 may comprise an inner surface 416 having tabs 418 surrounding the circumference of the rotation portion. The tabs 418 may be separated by notches 420 that are configured to receive engagement members 422 of the actuation portion 334 to thus engage the actuation portion 334 with the rotating portion 332. The control unit 330 may also comprise a bushing 424 that is received within the rotating portion 332, such that an upper surface 426 of the busing may contact lower surfaces 428 of the tabs 418 inside of the rotating portion.

When the actuation portion 334 is received within the opening of the rotating portion 332, the light bar 336 may be provided between the actuation portion 334 and the rotating portion 332. When the rotating portion 334 is rotated, the actuation portion 334 and/or the light bar 336 may rotate with the rotating portion. The engagement members 422 of the actuation portion 334 may be able to move through the notches 420 in a z-direction (e.g., towards the base portion), such that the actuation portion 334 (along with the light bar 336) may be able to move in the z-direction.

The control unit 330 may further comprise a flexible printed circuit board (PCB) 430 that may be arranged over a carrier 432. The flexible PCB 430 may comprise a main portion 434 on which most of the control circuitry of the control unit 330 (e.g., including a control circuit) may be mounted. The control unit 330 may comprise a plurality of light-emitting diodes (LEDs) 436 arranged around the perimeter of the flexible PCB 430 to illuminating the light bar 336. The flexible PCB 430 may comprise a switch tab 438 that may be connected to the main portion 434 (e.g., via flexible arms 440). The switch tab 438 may have a tactile switch 442 mounted thereto. The switch tab 438 of the flexible PCB 430 may be configured to rest on a switch tab surface 444 on the carrier 432. The carrier 432 may comprise engagement members 446 configured to be received within notches 448 in the bushing 424. A ring 450 may snap to a lower surface 452 of the rotating portion to hold the control unit 330 together. The clips 338 may be attached to the carrier 432 to allow the control unit 330 to be connected to the base portion.

When the actuation portion 334 is pressed, the actuation portion 334 may move along the z-direction until an inner surface 458 of the actuation member actuates the tactile switch 442. The actuation portion 334 may be returned to the idle position by the tactile switch 442. In addition, the control unit 330 may comprise an additional return spring for returning the actuation portion 334 to the idle position. For example, the tactile switch 442 may comprise a double-detent mechanical tactile switch. The tactile switch 442 may comprise a plurality of overlapping domes (e.g., two overlapping domes), and the control unit 330 may be configured to determine the plane in which the front surface 335 of the actuation portion 334 resides (e.g., the first plane and/or the second plane) based on which of the domes are under pressure (e.g., buckled). For example, a first dome may buckle under low pressure and may be used to indicate that the front surface 335 of the actuation portion 334 is in the first plane (e.g., the first plane 232), while a second dome may buckle under heavier pressure and may be used to indicate that the front surface 335 of the actuation portion 334 is in the second plane (e.g., the second plane 234).

The batteries 340 may be adapted to be received within a battery recess 462 in the carrier 432 as shown in FIG. 4D. The batteries 340 may be held in place by the battery retention strap 342, which may also operate as a negative electrical contact for the batteries and tamper resistant fastener for the batteries. The flexible PCB may comprise a contact pad 466 that may operate as a positive electrical contact for the batteries 340. The battery retention strap 342 may comprise a leg 468 that ends in a foot 470 that may be electrically connected to a flexible pad 472 (e.g., as shown in FIG. 4C) on the flexible PCB 430. The battery retention strap 342 may be held in place by the battery retention screw 344 received in an opening 476 in the carrier 432. When the battery retention screw 344 is loosened and removed from the opening 476, the flexible pad 472 may be configured to move (e.g., bend or twist) to allow the battery retention strap 342 to move out of the way of the batteries 340 to allow the batteries to be removed and replaced.

The control unit 330 may further comprise a magnetic strip 480 located on the inner surface 416 of the rotating portion 332 and extending around the circumference of the rotating portion. The flexible PCB 430 may comprise a rotational sensor pad 482 on which a rotational sensor (e.g., a Hall effect sensor integrated circuit 484) may be mounted. The rotational sensor pad 482 may be arranged perpendicular to the main portion 434 of the flexible PCB 430 as shown in FIG. 4D. The magnetic strip 480 may comprise a plurality of alternating positive and negative sections, and the Hall effect sensor integrated circuit 484 may comprise two sensor circuits operable to detect the passing of the positive and negative sections of the magnetic strip as the rotating portion 332 is rotated. Accordingly, the control circuit of the control unit 330 may be configured to determine the rotational speed and direction of rotation of the rotation portion 332 in response to the Hall effect sensor integrated circuit 484. The flexible PCB 430 may also comprise a programming tab 486 to allow for programming of the control circuit of the control unit 330.

As shown in FIG. 4D, the carrier 432 may comprise an actuator opening 490 adapted to receive the toggle actuator of the light switch when the control unit 330 is mounted to the base portion. The carrier 432 may comprise a flat portion 492 that may prevent the toggle actuator of the light switch from extending into the inner structure of the control unit 330 (e.g., if the toggle actuator is particularly long). The flexible PCB 430 may also comprise an antenna 494 on an antenna tab 496 that may lay against the flat portion 492 in the actuator opening 490.

While the rotating portions 214, 332 and the actuations portions 216, 334 of the control device 200 and the remote control device 310 shown and described herein have a circular shape, the rotating portions and the actuation portions could have other shapes. For example, the rotating portions and the actuation portions may a rectangular shape, a square shape, a diamond shape, a triangular shape, an oval shape, a star shape, or any suitable shape. The front surface of the actuations portions 216, 334 and/or the side surfaces of the rotating portions 214, 332 may be planar or non-planar. In addition, the light bars 218, 336 may have alternative shapes, such as a rectangular shape, a square shape, a diamond shape, a triangular shape, an oval shape, a star shape, or any suitable shape. The light bars 218, 336 may be continuous loops, partial loops, broken loops, a single linear bar, a linear or circular array of visual indicators, and/or other suitable arrangement. The surfaces of the control device 200 and/or the remote control device 310 may be characterized by various colors, finishes, designs, patterns, etc.

Figure 5:
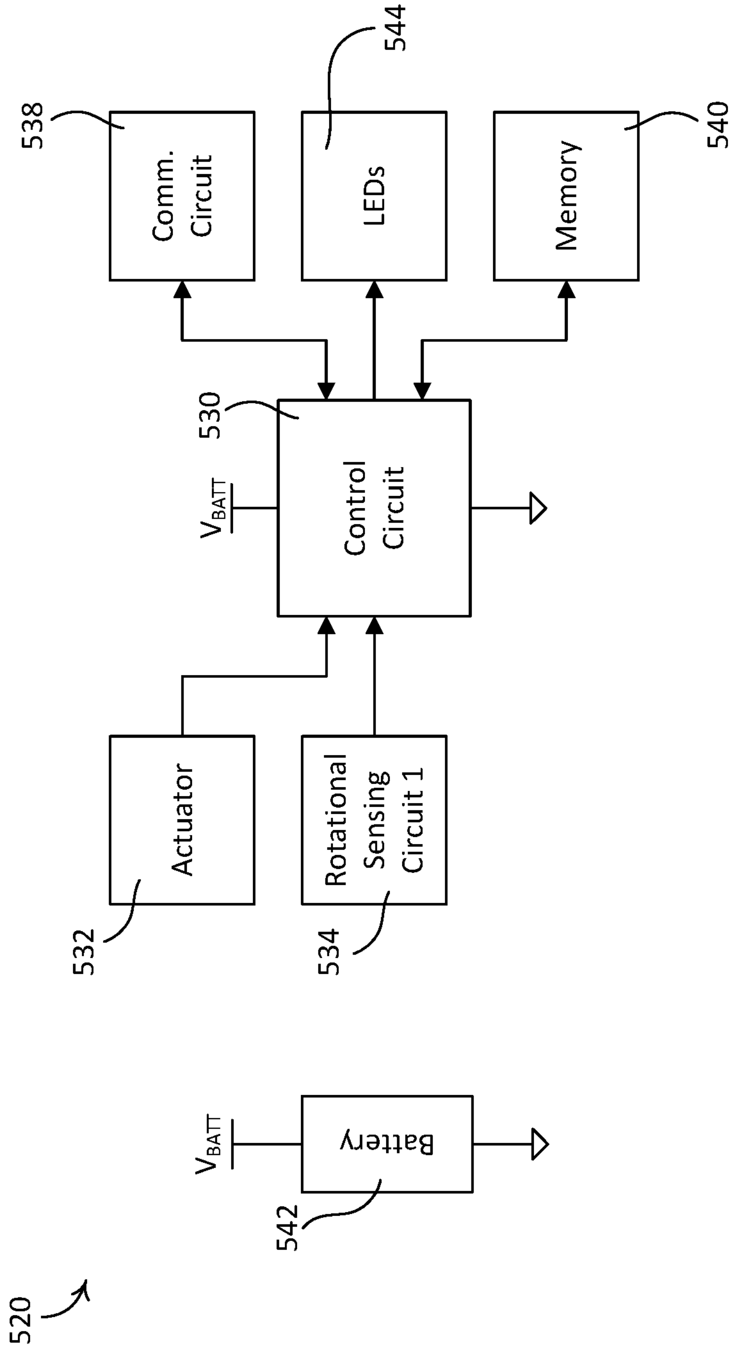
FIG. 5 shows a simplified block diagram of an example control device that may be deployed as a remote control device of the load control system illustrated in FIG. 1.

FIG. 5 is a simplified block diagram of an example control device 500 (e.g., a remote control device), which may be deployed as the remote control devices 112-118 in the lighting control system 100, the control device 200, and/or the remote control devices 310. The control device 500 may include a control circuit 530, one or more actuators 532 (e.g., buttons and/or switches), a rotational sensing circuit 534, a wireless communication circuit 538, a memory 540, a battery 542, and/or one or more LEDs 544. The memory 540 may be configured to store one or more operating parameters (e.g., such as a preconfigured color scene or a preset light intensity) of the control device 500. The battery 542 may provide power to one or more of the components shown in FIG. 5.

The one or more actuators 532 may include a button or switch (e.g., a mechanical button or switch, or an imitation thereof) such as those described in association with the actuation portion 216 of the control device 200 and/or the actuation portion 334 of the remote control device 310. For example, the actuators 532 may comprise a double-detent mechanical tactile switch (e.g., such as the tactile switch 442). The actuators 532 may be configured to send respective input signals to the control circuit 530 in response to actuations of the actuators 532 (e.g., in response to movements of the actuators 532). The rotational sensing circuit 534 may be configured to translate a force applied to a rotating mechanism (e.g., such as the rotating portion 214 of the control device 200 and/or the rotating portion 334 of the remote control device 310) into an input signal and provide the input signal to the control circuit 530. The rotational sensing circuit 534 may include, for example, one or more magnetic sensors (such as Hall-effect sensors (HES), tunneling magnetoresistance (TMR) sensors, anisotropic magnetoresistance (AMR) sensors, giant magnetoresistance (GMR) sensors, reed switches, or other mechanical magnetic sensors), a mechanical encoder, an optical encoder, and/or a potentiometer (e.g., a polymer thick film or other resistive trace on a printed circuit board).

The control circuit 530 may be configured to translate the input signals provided by the actuators 534 and/or the rotational sensing circuit 534 into control data (e.g., digital control signals) for controlling one or more electrical loads. For example, the control circuit 530 may be responsive to a first-depth actuation (e.g., the first depth-actuation 231) and/or a second-depth actuation (e.g., the second depth-actuation 233) of one or more of the actuators 532 (e.g., as described herein for the control device 200 and/or the remote control device 310). The control circuit 530 may cause the control data (e.g., digital control signals) to be transmitted to the electrical loads via the wireless communication circuit 538. For example, the wireless communication circuit 538 may transmit a control signal including the control data to the one or more electrical loads or to a central controller of the concerned load control system. The control circuit 530 may transmit a control signal including control data for turning one or more lighting loads on or off in response to an actuation of one of the actuators 534. The control circuit 530 may transmit one or more control signals including control data for adjusting the intensities of one or more lighting loads in response to rotations of the rotating mechanism determined from the rotational sensing circuit 534. The control circuit 530 may transmit one or more control signals including control data for adjusting the color (e.g., the color temperature) of one or more lighting loads in response to rotations of the rotating mechanism while one of the actuators 534 is being actuated.

The control circuit 530 may illuminated the LEDs 544 to present a light bar (e.g., such as the light bar 218 and/or the light bar 336) and/or one or more indicator lights to provide feedback about various conditions. When the control circuit 530 is transmitting control signals including control data for adjusting the intensities of one or more lighting loads, the control circuit may control the LEDs 544 to illuminate the light bar (e.g., illuminated in a single color, such as white) to display feedback information regarding the present intensity of one or more of the lighting loads. When the control circuit 530 is transmitting control signals including control data for adjusting the color of one or more lighting loads, the control circuit may control the LEDs 544 to illuminate the light bar with one or more colors to provide feedback of the present color of one or more of the lighting loads.

Figure 6:
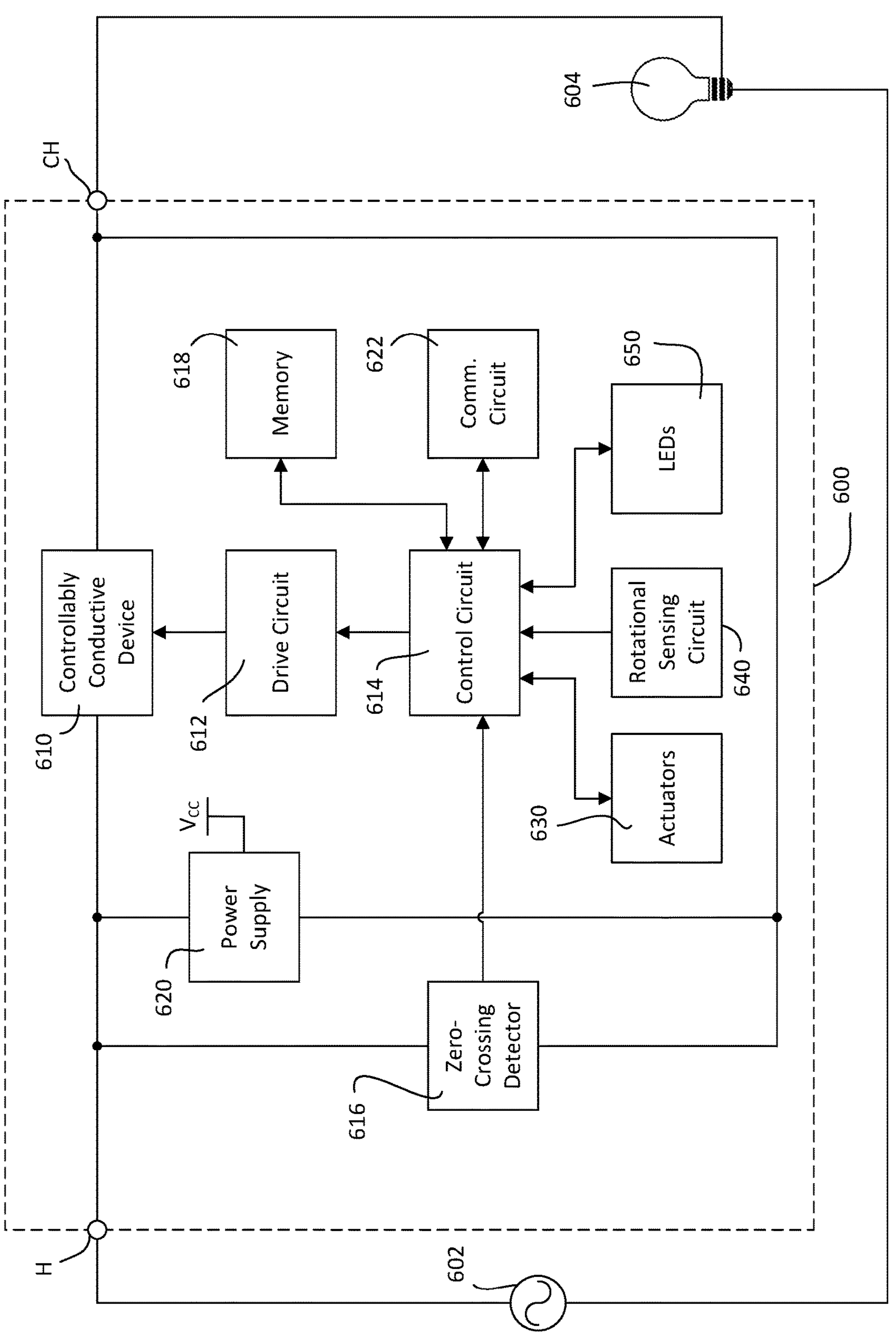
FIG. 6 shows a simplified block diagram of an example control device that may be deployed as a load control device (e.g., a dimmer switch) of the load control system illustrated in FIG. 1.

FIG. 6 is a simplified block diagram of an example control device 600 (e.g., a dimmer switch) that may be deployed as, for example, the dimmer switch 110 of the lighting control system 100 and/or the control device 200. The control device 600 may include a hot terminal H that may be adapted to be coupled to an AC power source 602. The control device 600 may include a controlled hot terminal CH (e.g., a switched hot and/or a dimmed hot terminal) that may be adapted to be coupled to an electrical load, such as a lighting load 604. The control device 600 may include a controllably conductive device 610 coupled in series electrical connection between the AC power source 602 and the lighting load 604. The controllably conductive device 610 may control the power delivered to the lighting load. The controllably conductive device 610 may include a relay and/or a bidirectional semiconductor switch, such as, for example, a triac, a field-effect transistor (FET) in a rectifier bridge, two FETs in anti-series connection, one or more insulated-gate bipolar junction transistors (IGBTs), or other suitable semiconductor switching circuit.

The control device 600 may include a control circuit 614. The control circuit 614 may include one or more of a processor (e.g., a microprocessor), a microcontroller, a programmable logic device (PLD), a field programmable gate array (FPGA), an application specific integrated circuit (ASIC), or any suitable controller or processing device. The control circuit 614 may be operatively coupled to a control input of the controllably conductive device 610, for example, via a gate drive circuit 612. The control circuit 814 may be used for rendering the controllably conductive device 610 conductive or non-conductive, for example, to turn the lighting load 604 on and off and/or to control the amount of power delivered to the lighting load 604.

The control circuit 614 may receive a control signal representative of the zero-crossing points of the AC main line voltage of the AC power source 602 from a zero-crossing detector 616. The control circuit 614 may be operable to render the controllably conductive device 610 conductive and/or non-conductive at predetermined times relative to the zero-crossing points of the AC waveform using a phase-control dimming technique. Examples of dimmers are described in greater detail in commonly-assigned U.S. Pat. No. 7,242,150, issued Jul. 10, 2007, entitled DIMMER HAVING A POWER SUPPLY MONITORING CIRCUIT; U.S. Pat. No. 7,546,473, issued Jun. 9, 2009, entitled DIMMER HAVING A MICROPROCESSOR-CONTROLLED POWER SUPPLY; and U.S. Pat. No. 8,664,881, issued Mar. 4, 2014, entitled TWO-WIRE DIMMER SWITCH FOR LOW-POWER LOADS, the entire disclosures of which are hereby incorporated by reference.

The control device 600 may include a memory 618. The memory 618 may be communicatively coupled to the control circuit 814 for the storage and/or retrieval of, for example, operational settings, such as, lighting presets and associated preset light intensities. The memory 618 may be implemented as an external integrated circuit (IC) or as an internal circuit of the control circuit 614. The control device 600 may include a power supply 620. The power supply 620 may generate a direct-current (DC) supply voltage $V_{CC}$ for powering the control circuit 614 and the other low-voltage circuitry of the control device 600. The power supply 620 may be coupled in parallel with the controllably conductive device 610. The power supply 620 may be operable to conduct a charging current through the lighting load 804 to generate the DC supply voltage $V_{CC}$.

The control circuit 614 may be responsive to inputs received from one or more of actuators 630 and/or a rotational sensing circuit 640. The control circuit 614 may control the controllably conductive device 610 to turn the lighting load 604 on and off, adjust the intensity of the lighting load, and/or adjust the color of the lighting load in response to the inputs received via the actuators 630 and/or the rotational position sensing circuit 640. The actuators 630 may include a button or switch (e.g., a mechanical button or switch, or an imitation thereof) such as those described in association with the actuation portion 216 of the control device 200 and/or the actuation portion 334 of the remote control device 310. For example, the actuators 630 may comprise a double-detent mechanical tactile switch (e.g., such as the tactile switch 442). The actuators 630 may be configured to send respective input signals to the control circuit 614 in response to actuations of the actuators 630. For example, the control circuit 614 may be responsive to a first-depth actuation (e.g., the first depth-actuation 231) and/or a second-depth actuation (e.g., the second depth-actuation 233) of one or more of the actuators 630 (e.g., as described herein for the control device 200 and/or the remote control device 310).

The rotary position sensing circuit 640 may be configured to translate a force applied to a rotating mechanism (e.g., such as the rotating portion 214 of the control device 200 and/or the rotating portion 332 of the remote control device 310) into an input signal and provide the input signal to the control circuit 614. The rotational position sensing circuit 640 may include, for example, one or more magnetic sensors (such as Hall-effect sensors (HES), tunneling magnetoresistance (TMR) sensors, anisotropic magnetoresistance (AMR) sensors, giant magnetoresistance (GMR) sensors, reed switches, or other mechanical magnetic sensors), a mechanical encoder, and/or an optical encoder.

The control device 600 may comprise a communication circuit 622. The communication circuit 622 may comprise a wireless communication circuit, for example, a radio-frequency (RF) transceiver coupled to an antenna for transmitting and/or receiving RF signals, an RF transmitter for transmitting RF signals, an RF receiver for receiving RF signals, or an infrared (IR) transmitter and/or receiver for transmitting and/or receiving IR signals. The communication circuit 622 may also comprise a wired communication circuit configured to be coupled to a wired control link, for example, a digital communication link and/or an analog control link, such as a 0-10V control link or a pulse-width modulated (PWM) control link. In addition, the communication circuit 622 may be coupled to the electrical wiring between the control device 600 and the lighting load 604 and may be configured to transmit a control signal to the lighting load 604 via the electrical wiring using, for example, a power-line carrier (PLC) communication technique.

The communication circuit 622 may be configured to transmit a control signal that includes the control data (e.g., a digital message) generated by the control circuit 614 to the lighting load 604. As described herein, the control data may be generated in response to a user input to adjust one or more operational aspects of the lighting load 604. The control data may include a command and/or identification information (e.g., such as a unique identifier) associated with the control device 600. In addition to or in lieu of transmitting the control signal to the lighting load 604, the communication circuit 622 may be controlled to transmit the control signal to a central controller of the lighting control system.

The control circuit 614 may be configured to turn the lighting load on and off by rendering the controllably conductive device 610 conductive and non-conductive in response to an actuation of one of the actuators 630. The control circuit 614 may be configured to transmit digital messages to the lighting load 604 via the communication circuit 622 for adjusting the intensity of the lighting load in response to rotations of the rotating mechanism determined from the rotational sensing circuit 640. In addition, the control circuit 614 may be configured to control the controllably conductive device 610 using the phase control technique to adjust the intensity of the lighting load in response to rotations of the rotating mechanism determined from the rotational sensing circuit 640. The control circuit 614 may be configured to transmit digital messages to the lighting load 604 via the communication circuit 622 for adjusting the color of the lighting load in response to rotations of the rotating mechanism while one of the actuators 630 is being actuated.

The control circuit 614 may be configured to illuminate one or more light sources, e.g., LEDs 650, to provide feedback of a status of the lighting load 604, to indicate a status of the control device 600, and/or to assist with a control operation (e.g., to provide a color gradient for controlling the color of the lighting load 604, etc.). The LEDs 650 may be configured to illuminate one or more visual indicators, such as a light bar (e.g., the light bar 218 and/or the light bar 336), to serve as indicators of various conditions. When the rotating mechanism is being rotated to adjust the intensity of the lighting load 604, the control circuit 614 may control the LEDs 650 to illuminate the light bar (e.g., illuminated in a single color, such as white) to display feedback information regarding the present intensity of the lighting load 604. When the rotating mechanism is being rotated while one of the actuators 630 is being actuated in order to adjust the color of the lighting load 604, the control circuit 614 may control the LEDs 650 to illuminate the light bar with one or more colors to provide feedback of the present color of the lighting load 604.

It should be noted that although the control device (e.g., the control device 200, 310, 500 or 600) has been described or depicted herein as comprising a rotating mechanism (e.g., such as a rotary knob or a dial) for receiving user inputs, other types of user input mechanisms may also be implemented on the control device (e.g., in addition to or in lieu of a rotary knob or a dial). These mechanisms may include, for example, a button or switch or an imitation thereof, and/or a touch sensitive device (e.g., such as a capacitive touch surface) configured to detect both point actuations and gestures. In examples, the button, switch and/or touch sensitive device may comprise an actuation portion defined by an upper portion and a lower portion. The actuation portion may be configured to pivot (e.g., about a pivot axis) in response to an actuation of the upper portion or the lower portion, and either or both of the upper portion and the lower portion may be capable of being actuated into different planes along an axis perpendicular to a base portion, as described herein.

Figure 7:
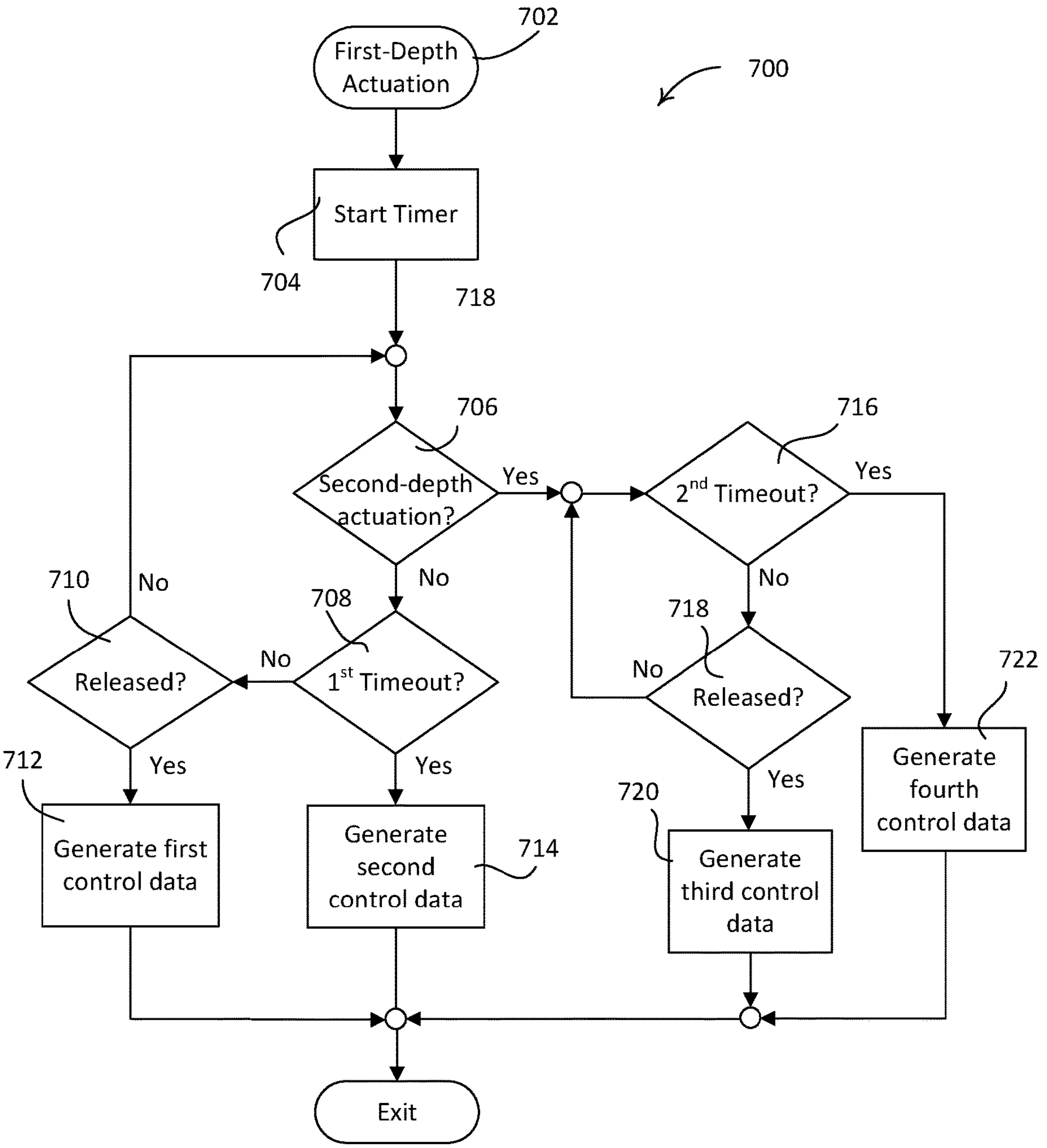
FIG. 7 shows a simplified flowchart of a first example control procedure that may be executed by a control device for controlling an electrical load.

FIG. 7 shows a simplified flowchart of an example control procedure 700 that may be executed by a control circuit of a control device (e.g., the control circuit 530 of the control device 500 and/or the control circuit 614 of the control device 600) for controlling multiple characteristics of one or more electrical loads, such as lighting loads. The control circuit may use the control procedure 700 to determine a depth that a front surface of an actuation portion (e.g., the front surface 215, 335 of the actuation portion 216, 336) is pressed towards a faceplate (e.g., the faceplate 212) to detect a first-depth actuation (e.g., the first-depth actuation 231) or a second-depth actuation (e.g., the second-depth actuation 233) of the front surface of the actuation portion. That is, the control circuit may determine a plane in which the front surface of the actuation portion resides during the first-depth actuation and/or the second-depth actuation. The control device may operate differently (e.g., control different characteristics of the lighting loads and/or change operating modes) based on which of the first-depth actuation and the second-depth actuation are applied to the front surface of the actuation portion and/or on how long the front surface of the actuation portion is maintained in the corresponding planes, for example, as described herein.

As shown in FIG. 7, the control procedure 700 may begin at 702 when a first-depth actuation of the actuation portion is detected by the control circuit, that is, when the control circuit detects that the front surface of the actuation portion is pressed from an idle plane (e.g., the idle plane 230) into a first plane (e.g., the first plane 232). Upon detecting the first-depth actuation of the actuation portion, the control circuit may start a timer at 704. The timer may be used to determine a duration in which the front surface of the actuation portion is maintained in a plane. At 706, the control circuit may determine whether a second-depth actuation of the actuation portion has been detected, that is, when the control circuit detects that the front surface of the actuation portion is placed into a second plane (e.g., the second plane 234). If the control circuit does not detect a second-depth actuation of the actuation portion, the control circuit may determine at 708 whether a first time period (e.g., a first timeout) has expired since the beginning of the first-depth actuation (e.g., based on the timer started at 704). If the first time period (e.g., the first timeout) has not expired, the control circuit may further determine whether the actuation portion has returned to the idle plane at 710 (e.g., determine whether the user has released the actuation portion and is no longer pressing the actuation portion towards the faceplate). If the control circuit determines that the actuation portion has been released at 710, the control circuit may generate first control data (e.g., for controlling a first characteristic of the loads) at 712, after which the control procedure 700 may exit. If the control circuit determines that the actuation portion has not been released at 710, the control circuit may return to 706 to determine whether a second-depth actuation has occurred.

If the control circuit determines that a second-depth actuation has not occurred at 706 and that the first time period (e.g., the first timeout) has expired at 708, the control circuit may generate second control data (e.g., for controlling a second characteristic of the loads) at 714, after which the control procedure 700 may exit. If the control circuit detects a second-depth actuation at at 706, the control circuit may determine at 716 whether a second time period (e.g., a second timeout) has expired since the beginning of the second-depth actuation (e.g., based on the timer started at 704). If the second time period (e.g., the second timeout) has not expired, the control circuit may further determine whether the actuation portion has returned to the idle plane at 718 (e.g., determine whether the user has released the actuation portion and is no longer pressing the actuation portion towards the faceplate). If the control circuit determines that the actuation portion has been released at 718, the control circuit may generate third control data (e.g., for controlling a third characteristic of the loads) at 720, after which the control procedure 700 may exit. If the control circuit determines that the actuation portion has not been released at 718, the control circuit may return to 716 to continue to check whether the second time period (e.g., the second timeout) has expired. Once the second time period expires (e.g., before the actuation portion is released), the control circuit may generate fourth control data (e.g., for controlling a fourth characteristic of the loads) at 722, after which the control procedure 700 may exit.

It should be noted that one or more of the steps described herein in association with the control procedure 700 may be omitted without affecting the basic features of the proposed techniques. Similarly, one or more extra steps may be added to the control procedure 700 to facilitate those basic features.

Figure 8A:
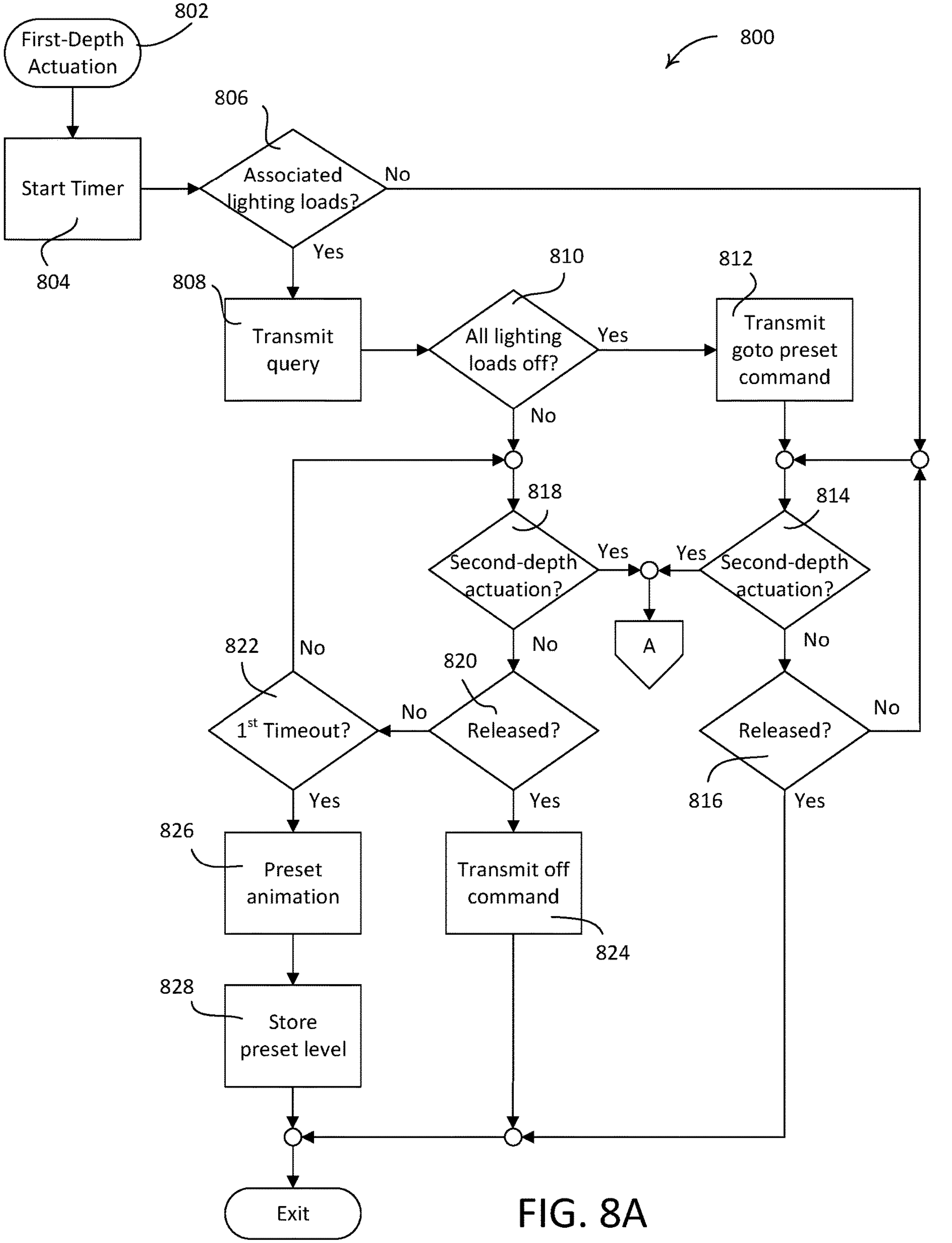
FIGS. 8A and 8B shows simplified flowcharts of a second example control procedure that may be executed by a control device for controlling an electrical load.
Figure 8B:
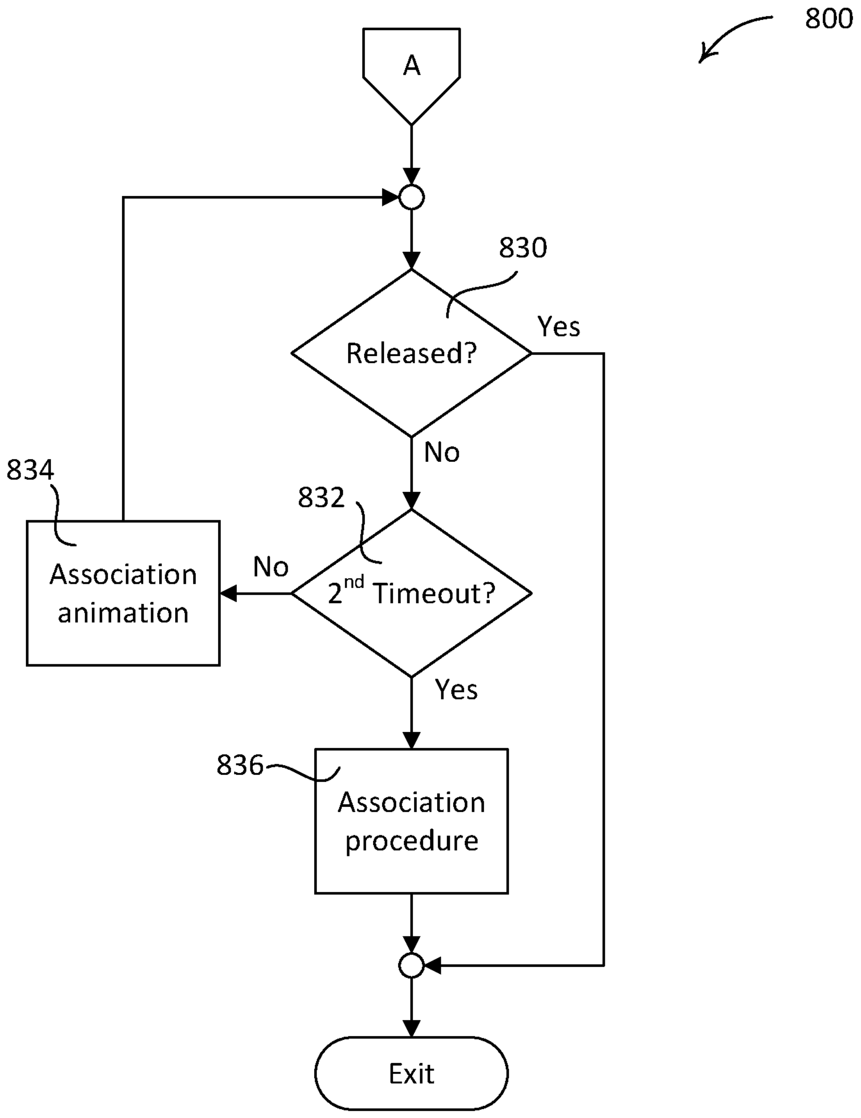

FIGS. 8A and 8B show simplified flowcharts of an example control procedure 800 that may be executed by a control circuit of a control device (e.g., the control circuit 530 of the control device 500 and/or the control circuit 614 of the control device 600) for controlling multiple characteristics of one or more electrical loads, such as lighting loads. The control circuit may use the control procedure 800 to determine a depth that a front surface of an actuation portion (e.g., the front surface 215, 335 of the actuation portion 216, 336) is pressed towards a faceplate (e.g., the faceplate 212) to detect a first-depth actuation (e.g., the first-depth actuation 231) or a second-depth actuation (e.g., the second-depth actuation 233) of the front surface of the actuation portion. That is, the control circuit may determine a plane in which the front surface of the actuation portion resides during the first-depth actuation and/or the second-depth actuation. The control device may operate differently (e.g., control different characteristics of the lighting loads and/or change operating modes) based on which of the first-depth actuation and the second-depth actuation are applied to the front surface of the actuation portion and/or on how long the front surface of the actuation portion is maintained in the corresponding planes, for example, as described herein.

As shown in FIG. 8A, the control procedure 800 may begin at 802 when a first-depth actuation of the actuation portion is detected by the control circuit, that is, when the control circuit detects that the front surface of the actuation portion is pressed from an idle plane (e.g., the idle plane 230) into a first plane (e.g., the first plane 232). Upon detecting the first-depth actuation of the actuation portion, the control circuit may start a timer at 804, and determine whether the control device is associated with any lighting loads at 806. Further, in some examples, the control circuit may be asleep (e.g., in a low power mode) upon detecting the first-depth actuation, and the control circuit may wake up from the sleep state upon detecting the first-depth actuation of the actuation portion 216. If the control circuit determines that the load control device is associated with at least one lighting load at 806, then the control circuit may transmit a query (e.g., a query message) to determine the intensity levels of the one or more lighting loads at 808. For example, the control circuit may transmit (e.g., wirelessly transmit) a message to one or more of the associated lighting loads and/or to a central controller querying the intensity levels of the associated lighting loads.

At 810, the control circuit may determine whether the lighting loads are off. If the control circuit determines that the lighting loads are off at 810, then the control circuit may transmit a command to turn on the lighting loads at 812 (e.g., transmit a comment to instruct the lighting loads to go to a preset intensity level). At 814, the control circuit may determine whether a second-depth actuation of the actuation portion has been detected, that is, when the control circuit detects that the front surface of the actuation portion is placed into a second plane (e.g., the second plane 234). If the control circuit does not detect a second-depth actuation of the actuation portion, the control circuit may determine whether the actuation portion has returned to the idle plane at 816 (e.g., determine whether the user has released the actuation portion and is no longer pressing the actuation portion into the faceplate). If the control circuit does not detect a second-depth actuation of the actuation portion at 814, before the actuation portion is release at 816, then the control procedure 800 may end.

If the control circuit determines that one or more of the lighting loads are on at 810, the control circuit may determine whether a second-depth actuation of the actuation portion has been detected at 818. If the control circuit does not detect a second-depth actuation at 818, the control circuit may determine whether the actuation portion is released at 820 prior to a first timeout (e.g., approximately three seconds) at 822. If the actuation portion is released prior to the first timeout, the control circuit may transmit a command to turn off the lighting loads at 824, and the control procedure 800 may exit. If the actuation portion is not released prior to the first timeout, the control circuit may determine whether the actuation portion is placed in the second plane (e.g., detect a second detent of the actuation portion) at 830. When the first timeout is reached at 822, the control circuit may generate a preset animation at 826 (e.g., by blinking one or more visual indicators, such as the light bar 218) and store a preset level for the lighting loads at 828, before the procedure 800 exits. For example, the control circuit may determine the present intensity levels of the associated lighting loads and store the present intensity levels of the lighting loads as a preset at 834. The preset may be used, for example, at 812 during future actuations of the actuation portion.

Referring to FIG. 8B, if the control circuit detects the second-depth actuation of the actuation portion at 814 or 818, the control circuit may determine if the front surface of the actuation portion has returned to the idle plane at 830 (e.g., determine whether the user has released the actuation portion and is no longer pressing the actuation portion towards the faceplate). If the actuation portion has not been released at 830, the control circuit may determine if a second timeout (e.g., six seconds) has occurred at 832. The second timeout may be determined based on when the timer started at 804. When the control circuit detects the second-depth actuation of the actuation portion, but the second timeout has not occurred at 832, the control device may provide an association animation at 834 (e.g., by blinking or strobing one or more visual indicators, such as the light bar 218). If the second timeout has not occurred by the time the actuation portion is released at 830, then the control procedure 800 may exit. However, if the second timeout occurs prior to the actuation portion being released (e.g., the user presses the actuation portion into the second plane for at least the amount of time of the second timeout), the control circuit may execute an association procedure at 836. During the association procedure, the control device may be associated with one or more electrical loads. It should be noted that if the control circuit determines that the control device is not associated with any electrical loads at 806, the control device proceed to 814, and possibly to 836 to perform the association procedure. After the control circuit executes the association procedure at 822, the control procedure 800 may exit.

It should be noted that one or more of the steps described herein in association with the control procedure 800 may be omitted without affecting the basic features of the proposed techniques. Similarly, one or more extra steps may be added to the control procedure 800 to facilitate those basic features.

Although described with reference to color and intensity, the control circuit (e.g., via the control procedure 700 and/or 800) may generate control signals for adjusting any type of characteristic of an electrical load in response to a rotation of the rotating mechanism when the rotating mechanism is in a particular plane. For example, the characteristics may be any of intensity, color (e.g., color temperature), volume, music selection, HVAC mode (e.g., air conditioning on/off, heat on/off, temperature, fan speed, etc.), ceiling fan speed, relative height/location of a motorized window treatment, or any of adjustable characteristics of the electrical loads described herein. Further, although described with reference to controlling a single electrical load, the control circuit may be configured to control a characteristic of one or more electricals load in response to a rotation of the rotating mechanism in the first plane, and another potentially different characteristic of one or more potentially different electrical loads in response to a rotation of the rotating mechanism in the second plane (e.g., and a third characteristic of one or more potentially different electrical loads in response to a rotation of the rotating mechanism in the third plane, etc.).

What is claimed is:

1. A control device configured for use in a load control system to control one or more electrical loads external to the control device, the control device comprising:

a base portion;

an actuation portion comprising a front surface that is parallel with a faceplate when installed, the front surface of the actuation portion biased to an idle plane along an axis that is perpendicular to the faceplate; and a control circuit configured to generate at least first and second control data for providing different control of the one or more electrical loads based respectively on first and second distances through which the front surface of the actuation portion is pressed away from the idle plane, wherein the first distance and the second distance are different, and wherein at least one of the first control data or the second control data is for toggling the one or more electrical loads between off and on.

2. The control device of claim 1, further comprising:

a load control circuit adapted to be electrically coupled in series between an AC power source and the one or more electrical loads for controlling power delivered to the one or more electrical loads; and wherein the base portion is configured to be mounted to an electrical wallbox.

3. The control device of claim 1, further comprising:

a direct-current (DC) power source configured to generate a direct current (DC) supply voltage for powering the control circuit; and a communication circuit configured to transmit a first control signal associated with the first control data and a second control signal associated with the second control data.

4. The control device of claim 1, wherein the base portion is configured to be mounted over a toggle actuator of a mechanical switch that controls whether power is delivered to the one or more electrical loads.

5. The control device of claim 1, wherein the first control data is for toggling the one or more electrical loads between off and on.

6. The control device of claim 5, wherein the second control data is for toggling the one or more electrical loads between off and on over a fade out period of time.

7. The control device of claim 5, further comprising:

a rotating portion rotatable with respect to the base portion;

wherein the second control data is for changing an operating mode of the control device, wherein, when in different operating modes, the control device is configured to control different characteristics of the one or more electrical loads in response to rotations of the rotating portion.

8. The control device of claim 7, wherein the one or more electrical loads comprise a lighting load and the characteristics comprise intensity and color of the lighting load.

9. The control device of claim 5, wherein the second control data causes the control circuit to enter an advanced mode, wherein, when in the advanced mode, the control circuit is configured to set a preset associated with the one or more electrical loads or associate the control device to an electrical load.

10. The control device of claim 1, wherein the control circuit is further configured to generate third control data in response to actuation of the actuation portion into a first plane for greater than a first predetermined amount of time, wherein the first plane is characterized by the actuation portion being pressed the first distance.

11. The control device of claim 10, wherein at least one of the first control data or the second control data is for toggling the one or more electrical loads between off and on, and the third control data is for setting a preset of the one or more electrical loads.

12. The control device of claim 10, wherein the control circuit is further configured to generate fourth control data in response to actuation of the actuation portion into a second plane for greater than a second predetermined amount of time, wherein the second plane is characterized by the actuation portion being pressed the second distance.

13. The control device of claim 12, wherein the fourth control data is for associating the control device with an electrical load.

14. The control device of claim 10, further comprising:

a rotating portion rotatable with respect to the base portion;

wherein the one or more electrical loads comprise a lighting load and wherein, in response to actuation of the actuation portion being pressed the first or second distance for a third predetermined amount of time, the control circuit is configured to toggle between intensity control and color control of the lighting load in response to rotations of the rotating portion.

15. The control device of claim 1, further comprising:

one or more visual indicators configured to be illuminated by one or more light sources.

16. The control device of claim 1, further comprising:

a rotating portion rotatable with respect to the base portion, wherein the actuation portion is attached to the rotating portion.

17. The control device of claim 1, further comprising:

a rotating portion rotatable with respect to the base portion, wherein the actuation portion is separate from the rotating portion and received in a central opening of the rotating portion.

18. A control device configured for use in a load control system to control one or more lighting loads external to the control device, the control device comprising:

a base portion configured to be mounted over a toggle actuator of a mechanical switch that controls whether power is delivered to the one or more lighting loads;

an actuation portion comprising a front surface that is parallel with a faceplate when installed, the front surface of the actuation portion biased to an idle plane along an axis that is perpendicular to the faceplate; and a control circuit configured to generate at least first and second control data based respectively on first and second distances through which the front surface of the actuation portion is pressed away from the idle plane, wherein the first distance and the second distance are different;

wherein the first control data is for toggling the one or more lighting loads between off and on, and the second control data is for changing an operating mode of the control device, wherein, when in different operating modes, the control device is configured to control different characteristics of the one or more lighting loads, the characteristics comprising intensity and color of the one or more lighting loads.

19. The control device of claim 18, further comprising:

a rotating portion rotatable with respect to the base portion, wherein the actuation portion is attached to the rotating portion, or the actuation portion is separate from the rotating portion and received in a central opening of the rotating portion.

20. A control device configured for use in a load control system to control one or more electrical loads external to the control device, the control device comprising:

a base portion;

an actuation portion comprising a front surface that is parallel with a faceplate when installed, the front surface of the actuation portion biased to an idle plane along an axis that is perpendicular to the faceplate; and a control circuit configured to generate at least first and second control data for providing different control of the one or more electrical loads based respectively on first and second distances through which the front surface of the actuation portion is pressed away from the idle plane, wherein the front surface of the actuation portion is closer to the base portion when pressed the second distance away from the idle plane than when the front surface is pressed the first distance away from the idle plane, and wherein at least one of the first control data or the second control data is for toggling the one or more electrical loads between off and on.

* * * * *